US012619987B2

(12) United States Patent
Cheng et al.

(10) Patent No.: US 12,619,987 B2
(45) Date of Patent: May 5, 2026

(54) TRANSACTION VERIFICATION METHOD AND APPARATUS USING A SECURE ELEMENT AT A TERMINAL DEVICE TO VERIFY VALIDITY OF THE TRANSACTION

(71) Applicants: Digital Currency Institute, The People's Bank of China, Beijing (CN); Huawei Technologies Co., Ltd., Shenzhen (CN)

(72) Inventors: Shuo Cheng, Hangzhou (CN); Heng Zhang, Hangzhou (CN); Guangyao Nie, Hangzhou (CN)

(73) Assignees: Digital Currency Institute, The People's Bank of China, Beijing (CN); Huawei Technologies Co., Ltd., Shenzhen (CN)

( * ) Notice: Subject to any disclaimer, the term of this patent is extended or adjusted under 35 U.S.C. 154(b) by 303 days.

(21) Appl. No.: 18/156,786

(22) Filed: Jan. 19, 2023

(65) Prior Publication Data

US 2023/0177505 A1      Jun. 8, 2023

Related U.S. Application Data

(63) Continuation of application No. PCT/CN2021/080336, filed on Mar. 12, 2021.

(30) Foreign Application Priority Data

Jul. 20, 2020    (CN) .......................... 202010698620.2

(51) Int. Cl.
*G06Q 20/40* (2012.01)
*G06Q 20/38* (2012.01)

(52) U.S. Cl.
CPC ....... *G06Q 20/401* (2013.01); *G06Q 20/3823* (2013.01); *G06Q 20/3825* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 7,379,920 B2 * | 5/2008 | Leung ................ | G06Q 30/0225 |
| | | | 705/50 |
| 10,990,963 B2 * | 4/2021 | Zhang ................... | H04L 9/3247 |

(Continued)

FOREIGN PATENT DOCUMENTS

| | | | | |
|---|---|---|---|---|
| CA | 2948106 C | * | 6/2022 | ........... H04L 63/061 |
| CA | 2944894 C | * | 8/2023 | ............. G06Q 40/02 |

(Continued)

OTHER PUBLICATIONS

Z. Saquib, M. Kumar, K. K. Kamal and B. Varyani, "Secure solution: One time mobile originated PKI," 2017 Annual IEEE International Systems Conference (SysCon), Montreal, QC, Canada. https://ieeexplore.ieee.org/document/7934752?source=IQplus (Year: 2017).*

(Continued)

*Primary Examiner* — El Mehdi Oussir
(74) *Attorney, Agent, or Firm* — Leydig, Voit & Mayer, Ltd.

(57) ABSTRACT

A transaction verification method is applied to an electronic device that includes a secure element (SE), a trusted execution environment (TEE), and a rich execution environment (REE), and includes, in a transaction verification process, execution of service logic and data storage are performed on a TEE side instead of on an SE side, and transaction validity verification is reserved on the SE side.

11 Claims, 14 Drawing Sheets

(56)     References Cited

U.S. PATENT DOCUMENTS

| | | | | |
|---|---|---|---|---|
| 11,107,071 | B2 * | 8/2021 | Carlsson | G06Q 20/3278 |
| 11,200,569 | B1 * | 12/2021 | James | G06Q 20/381 |
| 11,308,487 | B1 * | 4/2022 | Foster | G06Q 20/3829 |
| 11,334,883 | B1 * | 5/2022 | Auerbach | G06Q 20/223 |
| 11,475,442 | B1 * | 10/2022 | James | G06Q 20/3829 |
| 11,501,370 | B1 * | 11/2022 | Paya | G06Q 20/3676 |
| 11,734,416 | B2 * | 8/2023 | Li | G06F 21/44 |
| | | | | 726/26 |
| 12,271,898 | B1 * | 4/2025 | Arvanaghi | G06Q 20/10 |
| 2015/0339664 | A1 * | 11/2015 | Wong | H04L 63/0823 |
| | | | | 705/71 |
| 2020/0349568 | A1 * | 11/2020 | Feng | H04L 9/3239 |
| 2020/0394651 | A1 * | 12/2020 | Kreder, III | G06Q 20/22 |
| 2021/0216991 | A1 * | 7/2021 | Grassadonia | G06Q 20/204 |

FOREIGN PATENT DOCUMENTS

| | | | | | |
|---|---|---|---|---|---|
| CN | 106056419 | A | * | 10/2016 | |
| CN | 106355252 | A | | 1/2017 | |
| CN | 106506472 | A | | 3/2017 | |
| CN | 108229926 | A | * | 6/2018 | G06Q 10/103 |
| CN | 109214792 | A | * | 1/2019 | G06Q 20/387 |
| CN | 109408521 | A | | 3/2019 | |
| CN | 109754247 | A | * | 5/2019 | G06F 21/40 |
| CN | 110024422 | A | * | 7/2019 | H04W 4/08 |
| CN | 106506472 | B | * | 8/2019 | G06Q 20/38215 |
| CN | 110288345 | A | * | 9/2019 | G06Q 20/382 |
| CN | 110443700 | A | * | 11/2019 | G06Q 20/389 |
| CN | 110585733 | A | * | 12/2019 | A63F 13/85 |
| CN | 110647582 | A | | 1/2020 | |
| CN | 110855688 | A | * | 2/2020 | H04L 63/10 |
| CN | 108964924 | B | * | 6/2020 | H04L 63/0823 |
| CN | 111275422 | A | * | 6/2020 | A63F 13/85 |
| CN | 111507815 | A | * | 8/2020 | G06Q 20/382 |
| CN | 112437922 | A | * | 3/2021 | G06Q 20/3825 |
| CN | 112712359 | A | * | 4/2021 | G06Q 20/20 |
| CN | 113273146 | A | * | 8/2021 | H04L 67/63 |
| CN | 113962676 | A | * | 1/2022 | G06Q 20/401 |
| CN | 109766152 | B | * | 7/2022 | G06F 21/12 |
| CN | 111275411 | B | * | 7/2023 | G06Q 20/065 |
| EP | 3146747 | B1 | * | 7/2020 | G06Q 20/3829 |
| EP | 3726804 | A2 | * | 10/2020 | H04L 63/0442 |
| JP | 3228339 | U | * | 10/2020 | G06Q 20/065 |
| WO | WO-2017006134 | A1 | * | 1/2017 | G06Q 20/3678 |
| WO | WO-2020256998 | A1 | * | 12/2020 | H04L 9/0891 |

OTHER PUBLICATIONS

N. R. Kisore and S. Sagi, "A secure SMS protocol for implementing digital cash system," 2015 International Conference on Advances in Computing, Communications and Informatics (ICACCI), Kochi, India, 2015. https://ieeexplore.ieee.org/document/7275893?source= IQplus (Year: 2015).*

Y. Liu, X. Liu, C. Tang, J. Wang and L. Zhang, "Unlinkable Coin Mixing Scheme for Transaction Privacy Enhancement of Bitcoin, " in IEEE Access, vol. 6, pp. 23261-23270, 2018, doi: 10.1109/ ACCESS.2018.2827163. https://ieeexplore.ieee.org/document/ 8338002?source=IQplus (Year: 2018).*

Z. Cui et al., "A Hybrid BlockChain-Based Identity Authentication Scheme for Multi-WSN," in IEEE Transactions on Services Computing, vol. 13, No. 2, pp. 241-251, Mar. 1-Apr. 2020, https:// ieeexplore.ieee.org/abstract/document/8951253 (Year: 2020).*

R. Belchoir et al., "A Survey on Blockchain Interoperability: Past, Present, and Future Trends," INESC-ID, Instituto Superior Técnico , Universidade de Lisboa, Portugal, https://dl.acm.org/doi/pdf/10. 1145/3471140. (Year: 2021).*

* cited by examiner

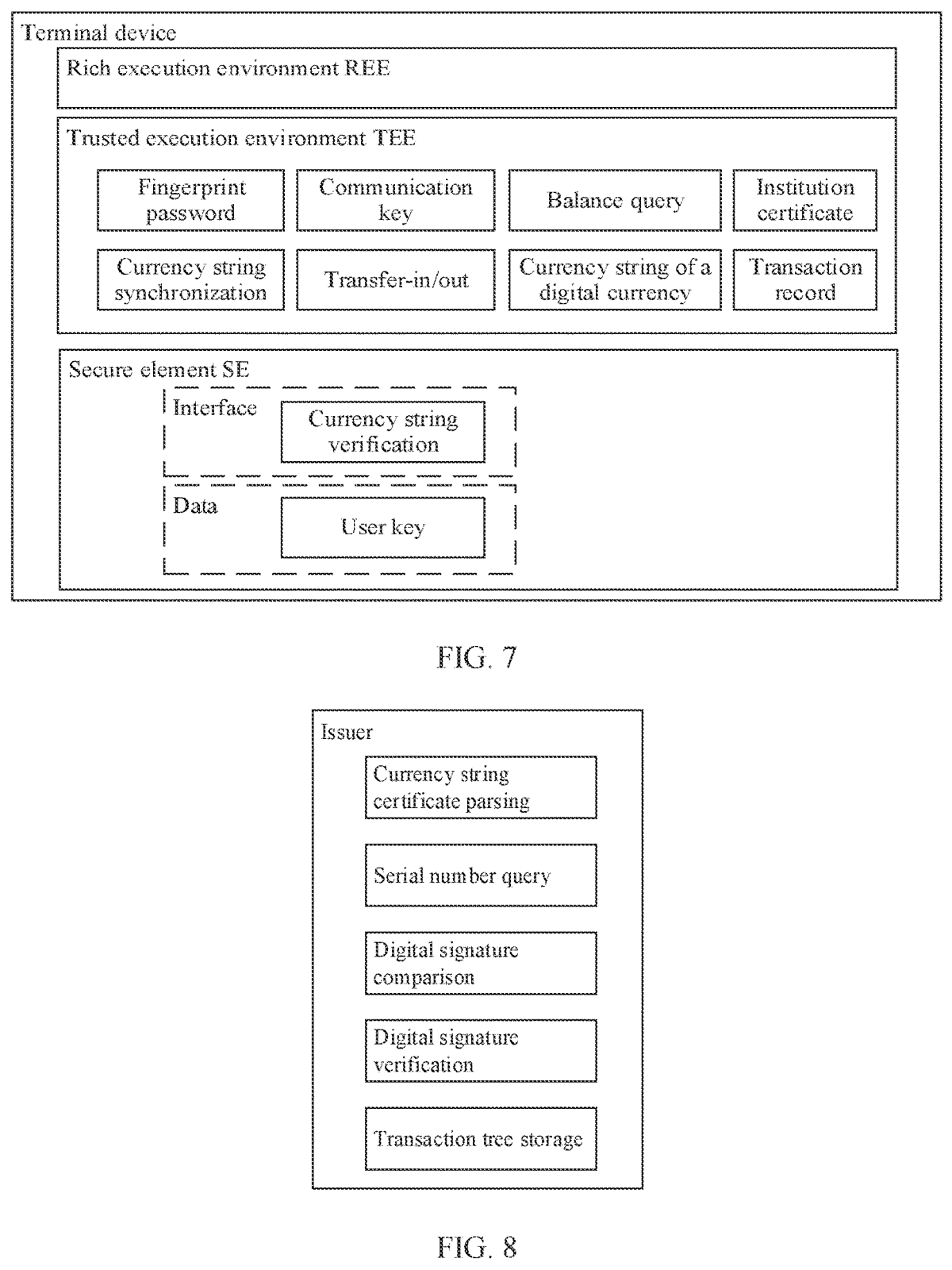

Terminal device

Rich execution environment REE

Trusted execution environment TEE

| Fingerprint password | Communication key | Balance query | Institution certificate |
|---|---|---|---|
| Currency string synchronization | Transfer-in/out | Currency string of a digital currency | Transaction record |

Secure element SE

Interface — Currency string verification

Data — User key

FIG. 7

Issuer

Currency string certificate parsing

Serial number query

Digital signature comparison

Digital signature verification

Transaction tree storage

FIG. 8

TRANSACTION VERIFICATION METHOD AND APPARATUS USING A SECURE ELEMENT AT A TERMINAL DEVICE TO VERIFY VALIDITY OF THE TRANSACTION

CROSS-REFERENCE TO RELATED APPLICATIONS

This is a continuation of International Patent Application No. PCT/CN2021/080336 filed on Mar. 12, 2021, which claims priority to Chinese Patent Application No. 202010698620.2 filed on Jul. 20, 2020. The disclosures of the aforementioned applications are hereby incorporated by reference in their entireties.

TECHNICAL FIELD

Embodiments of this disclosure relate to the field of computer technologies, and in particular, to a transaction verification method.

BACKGROUND

With rapid development of e-commerce and mobile payment, a conventional financial system and a conventional financial technology are constantly challenged. A digital currency concept is brought into the public eye by blockchain technology-based Bitcoins, and all major economies in the world start to research and promote digital currency-related technologies.

A digital currency can be issued by a central bank of a country. A blockchain technology and a distributed ledger technology or an existing banking system-based centralized financial account system are/is widely used in the industry to implement a high-performance and highly available digital currency. Although the blockchain technology and the distributed ledger technology have a plurality of advantages, for example, natural tamper resistance of data and distributed consensus, the blockchain technology and the distributed ledger technology still have a plurality of disadvantages: The blockchain technology is still in a development stage, and current performance may not support a transaction pressure caused by a large-scale application of the digital currency. Therefore, a solution based on an existing centralized banking system architecture is a preferential implementation solution. However, this solution still has a performance bottleneck in transaction verification.

To resolve this problem, the industry already has a digital currency technology in which controllable anonymity is implemented. To be specific, a model similar to a cash transaction is simulated in an existing centralized banking system to implement offline and online transactions of a digital currency. A currency certificate of the digital currency includes an original currency string and several transaction subchains. In the conventional technology, based on an original currency string, new transaction subchains are continuously added to an end of a currency certificate as a digital currency circulates, a digital signature is generated for overall data of the currency certificate after each transaction, and validity of the digital signature is verified. In the conventional technology, online and offline transaction functions of the digital currency can be effectively implemented, and validity and security problems of the currency certificate are resolved. However, there are still deficiencies such as specific redundant computation in a verification process and poor user experience due to limited performance.

Therefore, how to improve verification performance of a digital currency and improve user experience becomes a problem to be resolved urgently.

SUMMARY

Embodiments of this disclosure provide a transaction verification method and apparatus, which are applied to the field of computer technologies, to resolve the following problem:

How to improve verification performance of a digital currency in a transaction process, to improve user experience.

For ease of understanding of embodiments of this disclosure, the following first describes some technical concepts that appear in this disclosure. It should be understood that these technical concepts are applied to the following embodiments described in this disclosure. However, these embodiments are merely some embodiments of solutions provided in the present application. Therefore, these technical concepts are not necessarily applied to all embodiments of this disclosure.

Soft wallet: a client wallet application implemented on an electronic device and executed in a rich execution environment (REE).

Hard wallet: a wallet service logic and security module implemented on a trusted execution environment (TEE) and a secure element (SE) in combination with a security hardware feature on an electronic device.

Applet: an application developed and used in an SE by using a JAVA Card framework.

Issuer: The issuer refers to a background service of a digital currency issuer, and is responsible for verification, synchronization, auditing, and the like of a digital currency.

Original currency string: an immutable data structure used to represent a value of a digital currency, which uses a serial number as a unique identifier, and carries information such as a currency issuer and an amount.

Institution signature: The institution signature is used to prove validity of an original currency string, and is generated by performing digital signature on an original currency string by using a private key of a digital currency issuer.

Transaction subchain: The transaction subchain is added to an original currency certificate when two users perform a transaction, to record value delivery of a payment behavior, and includes information such as a transaction amount.

Currency certificate: The currency certificate is formed by connecting an original currency string to several transaction subchains, and validity of the currency certificate is ensured by an iterated digital signature.

Preorder transaction: data that is of a currency certificate and that is obtained before a specific transaction subchain is added to the same currency certificate.

Digital signature: a transaction signature added to an end of a currency certificate, which is used to prove validity of a transaction subchain and a preorder transaction, and is generated by using a private key of a payer.

Dual offline transaction: a transaction generated by delivering a currency certificate by using only a terminal device when both two parties that perform a transaction by using a digital currency are in an offline state. In this transaction, a new transaction subchain is added to an end of an original currency certificate to mark an amount of the current transaction, and the amount of the transaction subchain at the end indicates a value of a new currency certificate.

Serial number: The serial number is used as a unique identifier of an original currency string, and has a same concept as a serial number of a paper currency.

Currency string synchronization: As a user uses a digital currency, a large quantity of petty currency strings is gradually accumulated in a hard wallet of the user. In this case, performance of the hard wallet is affected. Therefore, the user and an issuer need to operate synchronously, to integrate the petty currency strings in the wallet into a large currency string, and redeliver the large currency string to the wallet or deposit the large currency string in a bank account of the user.

The following describes this disclosure in a plurality of aspects. It is easy to understand that the plurality of aspects may be separately implemented, or any two or more of the plurality of aspects may be selected for a joint implementation. For implementations and beneficial effects of the plurality of aspects, refer to each other.

In the descriptions of this disclosure, a transaction subchain at an end and a last transaction subchain have a same meaning.

According to a first aspect, an embodiment of this disclosure provides a transaction verification method. The method is applied to a first electronic device that includes an SE, a TEE, and an REE. The method includes the following. The REE sends a first transaction request message to the TEE, where the first transaction request message includes a transaction type of a transaction, the TEE executes first service logic based on the transaction type to obtain a first verification instruction, where the first verification instruction includes a to-be-verified digital signature, the TEE sends the first verification instruction to the SE, the SE verifies validity of the transaction based on the to-be-verified digital signature to obtain a first verification result, and sends the first verification result to the TEE, the TEE sends a first transaction response message to the REE, where the first transaction response message includes the first verification result, and when the first verification result indicates that the verification succeeds, the REE sends a second transaction request message to a second electronic device based on a receiver identifier of the transaction, where the receiver identifier is used to indicate the second electronic device.

For example, a user initiates a payment request at a soft wallet of the REE. After obtaining an address of a payee through negotiation, the user initiates a payment operation at the soft wallet on the REE side, and initiates a payment request message to the TEE. In this example, the first transaction request message is the payment request. After receiving the payment request message, the TEE executes the first service logic, that is, executes payment service logic, for example, basic verification such as transaction quantity verification and transaction quota verification, and sends the first verification instruction to the SE, so that the SE verifies validity of a payment transaction based on a digital signature and returns a verification result to the TEE for storage. In the conventional technology, after obtaining an address of a payee through negotiation, a user initiates a payment operation at a soft wallet on an REE side, and generates a payment instruction for interaction with an SE, and the SE executes payment service logic and stores a currency certificate.

An SE in an electronic device is a hardware-isolated independent operating environment, and storage space and computing performance are limited. Compared with the conventional technology, in this disclosure, the first service logic and data storage are implemented on the TEE side, and transaction validity verification is reserved on the SE side.

Therefore, performance on a terminal side is fully utilized on a premise of ensuring security, thereby significantly improving user experience.

In a possible implementation, the method further includes the following. The TEE has stored at least one candidate data certificate.

In a possible implementation, that the TEE executes first service logic based on the transaction type includes that the TEE executes the first service logic based on the transaction type and the at least one candidate data certificate.

In a possible implementation, the data certificate is a currency certificate, the currency certificate includes an original currency string or an original currency string and at least one transaction subchain, the digital signature is a transaction signature added to an end of the currency certificate, and is used to indicate validity of the transaction subchain, the original currency string includes an amount of the original currency string, an issuer certificate, and an institution signature, and the transaction subchain includes a subchain digital signature corresponding to the transaction subchain.

Further, a transaction subchain is generated for each transaction as transactions are performed, where a subchain digital signature in each transaction subchain is a digital signature generated based on a digital signature result corresponding to a previous transaction and data of a current transaction, that is, $Signature(n)=Sign(Signature(n-1)+transaction(n))$. $Signature(n-1)$ identifies a digital signature generated for the previous transaction of the current transaction, and $transaction(n)$ represents information related to the current transaction. It may be understood that an incremental chain signature structure is formed in this signature manner. In the conventional technology, a digital signature in each transaction subchain is obtained by performing digest computation on data of an entire currency certificate, that is, each digital signature needs to be generated by performing overall signature on all preorder transaction data. The overall signature solution is replaced with the chain signature solution. Therefore, redundant digest computation is reduced in a process of generating the digital signature for the currency certificate and verifying the digital signature, thereby improving performance of currency certificate generation and verification on the terminal side, improving user experience on the terminal side, and ensuring validity and integrity of the entire certificate.

In a possible implementation, the first transaction request message further includes a transaction amount of the transaction.

In a possible implementation, that the TEE executes the first service logic based on the transaction type and the at least one candidate data certificate includes that the TEE selects a to-be-verified currency certificate from at least one candidate currency certificate based on the transaction type and the transaction amount, the TEE performs basic verification on the to-be-verified currency certificate, where the basic verification includes a transaction quantity or transaction quota verification, and the TEE extracts a subchain digital signature of a last transaction subchain of the currency certificate that succeeds in the basic verification, to generate the first verification instruction, where the subchain digital signature of the last transaction subchain of the currency certificate that succeeds in the basic verification is the to-be-verified digital signature, and the first verification instruction includes the subchain digital signature of the last transaction subchain of the currency certificate that succeeds in the basic verification and the transaction amount.

Further, the TEE selects the to-be-verified currency certificate from the at least one candidate currency certificate based on the transaction type and the transaction amount. Further, the TEE may select, starting from a large currency certificate, the at least one currency certificate from all currency certificates stored in the TEE, the TEE may select, from the currency certificates stored in the TEE and based on the transaction amount, one currency certificate whose balance is closest to the transaction amount, the TEE may select, from the currency certificates stored in the TEE, currency certificates whose balances are greater than or equal to the transaction amount, and select the at least one currency certificate based on a specific algorithm, the TEE may select a specific issuer, and select a single currency certificate that has a minimum balance and that meets a requirement of the transaction amount or integrate a plurality of currency strings with less balances to meet a requirement of the transaction amount, or the TEE may select the currency certificate according to another rule. This is not particularly limited in this embodiment of this disclosure.

Further, that the TEE performs basic verification on the to-be-verified currency certificate may include verifying whether the transaction amount, a wallet quota, the transaction quantity, the transaction quota, and the like are valid. Verifying the transaction amount may include verifying whether a balance of the currency certificate meets a requirement of the transaction amount. The balance of the currency certificate may be stored in the TEE. The wallet quota, the transaction quantity, the transaction quota, and the like may be preset on the TEE and verified by the TEE. Alternatively, the wallet quota, the transaction quantity, the transaction quota, and the like may be preset on the SE, then read by the TEE from the SE, and then verified by the TEE. The transaction quantity is used as an example. Whether the transaction quantity falls within a preset quota may be determined by determining a quantity of transaction subchains or a length of the currency certificate. It may be understood that the basic verification is merely an example. The basic verification is not limited in this disclosure.

In a possible implementation, the TEE extracts the subchain digital signature of the last transaction subchain of the currency certificate that succeeds in the basic verification, to generate the first verification instruction, where the subchain digital signature of the last transaction subchain of the currency certificate that succeeds in the basic verification is the to-be-verified digital signature, and the first verification instruction includes the subchain digital signature of the last transaction subchain of the currency certificate that succeeds in the basic verification and the transaction amount, and the TEE sends the first verification instruction to the SE.

It may be understood that the TEE does not need to send the first verification instruction to the SE in some procedures. For example, when the TEE does not need the SE to generate a new transaction subchain, for example, does not need to perform operations such as reading a current total balance of a wallet, or when a new currency certificate received for the first time needs to be verified, the first verification instruction does not need to be sent to the SE.

In a possible implementation, the currency certificate that succeeds in the basic verification includes a serial number, and the serial number is a unique identifier of the currency certificate that succeeds in the basic verification, and that the SE verifies validity of the transaction based on the to-be-verified digital signature to obtain a first verification result includes that the SE generates transaction information based on the transaction amount in the first verification instruction, the SE compares a locally stored reference digital signature with the subchain digital signature of the last transaction subchain in the first verification instruction based on the serial number, and when the locally stored reference digital signature is consistent with the subchain digital signature of the last transaction subchain in the first verification instruction, the SE generates, based on the transaction information, the subchain digital signature of the last transaction subchain, and a private key locally stored in the SE, a digital signature corresponding to the transaction, the SE generates, based on the digital signature corresponding to the transaction and the transaction information, a transaction subchain corresponding to the transaction, where a subchain digital signature in the transaction subchain corresponding to the transaction is the digital signature corresponding to the transaction, and the SE generates the first verification result including the transaction subchain corresponding to the transaction. It may be understood that the SE may locally store the digital signature corresponding to the transaction.

It may be understood that if the to-be-verified currency certificate selected by the TEE includes at least one currency certificate, the first verification instruction includes a digital signature of a last transaction subchain of each currency certificate in the at least one currency certificate. After receiving the first verification instruction, the SE separately compares, based on the serial number, the subchain digital signature of each last transaction subchain in the first verification instruction with the reference digital signature locally stored in the SE. When the reference digital signature locally stored in the SE is consistent with the subchain digital signature of the last transaction subchain, the SE generates, based on the transaction information, the subchain digital signature of the last transaction subchain, and the private key locally stored in the SE, the digital signature corresponding to the transaction. It may be understood that, each time signature comparison is consistent, one digital signature corresponding to the transaction is generated, and the SE generates, based on the digital signature corresponding to the transaction and the transaction information, the transaction subchain corresponding to the transaction.

For example, a transaction initiator initiates a transfer transaction of 5 yuan. If the TEE locally selects five currency certificates of 1 yuan, the TEE sends subchain digital signatures of last transaction subchains of the five currency certificates of 1 yuan to the SE. After receiving the subchain digital signatures, the SE separately compares, based on a serial number, the subchain digital signatures that are of the last transaction subchains of the five currency certificates of 1 yuan and that come from the TEE with locally stored signature information. Each time comparison is consistent, one digital signature corresponding to the transaction and one transaction subchain corresponding to the transaction are generated. If all the subchain digital signatures of the last transaction subchains of the five currency certificates are consistent with the signature information, the SE generates five digital signatures corresponding to the transaction and five transaction subchains corresponding to the transaction. The first verification result includes the five transaction subchains corresponding to the transaction.

In a possible implementation, the SE generates a transaction information part in a new transaction subchain based on the transaction amount, a unique payee identifier, and a unique transaction identifier.

In a possible implementation, the TEE stores the first verification result, and the TEE updates, based on the serial number, the transaction subchain corresponding to the transaction to the currency certificate that succeeds in the basic verification.

In a possible implementation, the method further includes The first electronic device synchronizes, to a server, the currency certificate that is updated and that succeeds in the basic verification. Further, synchronization timing of the currency certificate may be that the user manually triggers synchronization or synchronization is automatically triggered when the transaction quantity reaches an upper limit. This is not limited in this disclosure. It should be noted that when synchronizing the currency certificate to the server, the first electronic device may also synchronously upload other information related to the currency certificate, such as a currency string balance and a transaction record.

In a possible implementation, the method further includes that the first electronic device receives a confirmation message from the second electronic device to complete the transaction. After receiving the confirmation message, the first electronic device determines to mark the currency certificate with a deletion identifier when an amount of the currency certificate is used up. After the currency certificate is synchronized to the server, if the currency certificate is marked with the deletion identifier, the server deletes the currency certificate.

According to a second aspect, a transaction verification method is provided. The method is applied to a second electronic device that includes a secure element SE, a trusted execution environment TEE, and a rich execution environment REE. The method includes that the REE receives a second transaction request message from a first electronic device, and sends the second transaction request message to the TEE, where the second transaction request message includes at least one data certificate, the TEE executes second service logic based on the at least one data certificate to obtain a second verification instruction, where the second verification instruction includes a to-be-verified digital signature, the TEE sends the second verification instruction to the SE, the SE verifies validity of the at least one data certificate based on the to-be-verified digital signature to obtain a second verification result, and sends the second verification result to the TEE, where the second verification result indicates whether validity verification of the at least one data certificate succeeds, the TEE receives the second verification result from the SE, stores a data certificate that succeeds in the verification, and sends a second transaction response message to the REE, where the second transaction response message is used to indicate whether a transaction succeeds, and the REE sends the second transaction response message to the first electronic device.

An SE in an electronic device is a hardware-isolated independent operating environment, and storage space and computing performance are limited. In the method of this disclosure, the second service logic and data storage are implemented on the TEE side, and data certificate validity verification is reserved on the SE side. Therefore, performance on a terminal side is fully utilized on a premise of ensuring security, thereby significantly improving user experience.

In a possible implementation, the data certificate includes a currency certificate, the currency certificate includes an original currency string or an original currency string and at least one transaction subchain, the original currency string includes an amount of the original currency string, an issuer certificate, and an institution signature, and the transaction subchain includes a subchain digital signature corresponding to the transaction subchain.

Further, a transaction subchain is generated for each transaction as transactions are performed, where a subchain digital signature in each transaction subchain is a digital signature generated based on a digital signature result corresponding to a previous transaction and data of a current transaction, that is, Signature(n)=Sign(Signature(n−1)+transaction(n)). Signature(n−1) identifies a digital signature generated for the previous transaction of the current transaction, and transaction(n) represents information related to the current transaction. It may be understood that an incremental chain signature structure is formed in this signature manner. In the conventional technology, a digital signature in each transaction subchain is obtained by performing digest computation on data of an entire currency certificate, that is, each digital signature needs to be generated by performing overall signature on all preorder transaction data. The overall signature solution is replaced with the chain signature solution. Therefore, redundant digest computation is reduced in a process of generating the digital signature for the currency certificate and verifying the digital signature, thereby improving performance of currency certificate generation and verification on the terminal side, improving user experience on the terminal side, and ensuring validity and integrity of the entire certificate.

In a possible implementation, the currency certificate includes a serial number, and the serial number is a unique identifier of the currency certificate.

In a possible implementation, the second service logic includes verification of an institution signature of the original currency string or verification of a preorder transaction of a last transaction subchain of the currency certificate. Further, most currency string verification logic may be executed in the TEE, including the verification of the institution signature of the original currency string and verification of a subchain digital signature of another transaction subchain other than the last transaction subchain. The TEE may further perform amount verification. The amount verification includes verifying whether a sum of an amount of a last transaction subchain of each currency certificate in at least one currency certificate is equal to a transaction amount. When verifying a digital signature of the last transaction sub chain, the TEE obtains information required for verifying the subchain digital signature of the last transaction subchain. The information may include a subchain digital signature of a penultimate transaction subchain, information about the last transaction subchain, and the subchain digital signature of the last transaction subchain.

In a possible implementation, the TEE sends the second verification instruction to the SE, where the second verification instruction may include the subchain digital signature of the penultimate transaction subchain, the information about the last transaction subchain, and the subchain digital signature of the last transaction subchain. It may be understood that the second verification instruction may alternatively include other information that can be used to verify the validity of the data certificate. This is not particularly limited in this disclosure.

It should be noted that, in the conventional technology, a digital signature in each transaction subchain is obtained by performing digest computation on data of an entire currency certificate. Therefore, in a process of generating the digital signature, content of the entire currency certificate needs to be completely transmitted from the TEE to the SE. The SE is not suitable for large-scale inward and outward data transmission due to a limited transmission capability of the SE. Consequently, performance and experience of a dual offline transaction scenario on the terminal side are affected in this solution. In this disclosure, because the subchain digital signature in each transaction subchain is a digital signature generated based on a digital signature result corresponding to a previous transaction and data of a current transaction, less information is required for generating each digital signature, thereby improving performance and breaking through a storage bottleneck of the SE, and improving transaction performance on the terminal side.

In a possible implementation, that the SE verifies validity of the at least one data certificate based on the to-be-verified digital signature to obtain a second verification result includes verifying validity of the last transaction subchain of each currency certificate in the at least one currency certificate.

In a possible implementation, after validity verification of the last transaction subchain succeeds, the SE stores the subchain digital signature of the last transaction subchain, where the subchain digital signature of the last transaction subchain is used as a reference value for comparison and verification in a subsequent transaction. For example, the validity of the last transaction subchain may be verified by verifying the subchain digital signature of the transaction subchain.

In a possible implementation, after verifying the validity of the data certificate, the SE sends the second verification result to the TEE, where the second verification result indicates whether validity verification of the at least one data certificate succeeds.

In a possible implementation, the TEE receives the second verification result from the SE, and the TEE stores the data certificate that succeeds in the verification, and sends the second transaction response message to the REE, where the second transaction response message is used to indicate whether the transaction succeeds. It may be understood that when the validity of the at least one data certificate fails in verification, after receiving the second verification result from the SE, the TEE does not store the data certificate that fails in verification.

In a possible implementation, after receiving the second transaction response message, the REE sends the second transaction response message to the first electronic device. The second transaction response message is used to indicate, to a transaction initiator of the first electronic device, that the current transaction is completed. The second transaction response message may include an identifier indicating whether the current transaction succeeds or fails, and may further include a random number. The random number may be used as a unique identifier identifying the current transaction, and the random number is negotiated by the transaction initiator and a transaction receiver before the currency certificate is delivered. In this embodiment, a confirmation message is used as an example to describe the second transaction response message.

Because the currency certificate is of a chain signature structure, the subchain digital signature of the last transaction subchain may be used to verify integrity and validity of overall information of the currency certificate. Therefore, security effect the same as that implemented when all verification computation and data are put into the SE can be achieved, provided that the subchain digital signature of the last transaction subchain is generated and verified in the SE in an interaction operation on the terminal side.

In this disclosure, only the subchain digital signature of the last transaction subchain and a user key are stored in the SE. Signature generation and signature verification functions are reserved on the SE side, and other service logic is implemented on the TEE side, thereby improving performance and breaking through a storage bottleneck of the SE and improving transaction performance on the terminal side on a premise of ensuring equivalent security.

In a possible implementation, the method further includes that the second electronic device synchronizes, to a server, the data certificate that succeeds in validity verification. Synchronization timing of the data certificate may be that the user manually triggers synchronization or synchronization is automatically triggered when the transaction quantity reaches an upper limit. This is not limited in this disclosure.

According to a third aspect, a transaction verification method is provided. The method is applied to a server, and includes receiving a data certificate from an electronic device, and performing incremental verification on the data certificate, where the incremental verification includes comparing the data certificate with a historical data certificate stored in the server, and verifying validity of data that is in the data certificate and that is not recorded in the historical data certificate, and storing the data certificate that succeeds in validity verification.

In the conventional technology, when a server needs to perform overall verification on all data certificate data in a verification process, frequent and large-scale data certificate verification results in large consumption of resources and low performance. In this disclosure, the incremental verification is performed on the data certificate on the server side, only the validity of data that is in the data certificate and that is not in a historical record is verified. This reduces redundant verification computation. In this way, in a high-concurrency scenario of the server, the data certificate can be quickly verified, and resources of the server can be saved.

In a possible implementation, the historical data certificate is verified data related to the data certificate. It should be noted that, when storing the historical data certificate, the server may store only a digital signature of a currency certificate, or may store an entire currency certificate. A specific storage form is not limited in this embodiment of this disclosure. In this embodiment, an example in which the server stores the digital signature of the currency certificate is used for description.

In a possible implementation, the data certificate includes a currency certificate, the currency certificate includes an original currency string or an original currency string and at least one transaction subchain, the original currency string includes an amount of the original currency string, an issuer certificate, and an institution signature, the transaction subchain includes a transaction amount, transaction information, a public key, and a subchain digital signature, and the subchain digital signature is a digital signature generated based on a digital signature corresponding to a previous transaction and data of a current transaction.

Further, a transaction subchain is generated for each transaction as transactions are performed, where a digital signature in each transaction subchain is a digital signature generated based on a digital signature result corresponding to a previous transaction and data of a current transaction, that is, Signature(n)=Sign(Signature(n−1)+transaction(n)). Signature(n−1) identifies a digital signature generated for the previous transaction of the current transaction, and transaction(n) represents information related to the current transaction. It may be understood that an incremental chain signature structure is formed in this signature manner. In the conventional technology, a digital signature in each transaction subchain is obtained by performing digest computation on data of an entire currency certificate, that is, each digital signature needs to be generated by performing overall signature on all preorder transaction data. The overall signature solution is replaced with the chain signature solution. Therefore, redundant digest computation is reduced in a process of generating the digital signature for the currency certificate, thereby improving performance of currency certificate generation on the terminal side, improving user experience on the terminal side, and ensuring validity and integrity of the entire certificate.

It may be understood that, based on the foregoing digital signature generation process, when the currency certificate is synchronized to the server and the server performs digital signature verification, redundant digest computation can be reduced, verification performance can be improved, user experience on the terminal side can be improved, and validity and integrity of the entire certificate are ensured.

In a possible implementation, the currency certificate includes a serial number, and the serial number is a unique identifier of the currency certificate.

In a possible implementation, comparing the data certificate with a historical data certificate stored in the server includes querying, based on the serial number, whether a historical currency certificate corresponding to the serial number exists in the server, traversing transaction subchains of the currency certificate when the historical currency certificate having the same serial number as the currency certificate exists in the server, and verifying an unverified transaction subchain that is in the currency certificate and that is not in the historical currency certificate. For example, when the historical currency certificate having the same serial number as the currency certificate exists in the server, digital signature data of the currency certificate is traversed starting from a digital signature of the original currency string, and each digital signature in the currency certificate is compared with a node of the historical currency certificate. Once there is a node on which data is inconsistent, the currency certificate fails in verification. After traversing is completed, if comparison of signatures of all the transaction subchains of the currency certificate is consistent, the currency certificate is valid. After all branch nodes of the historical record are compared, if there is still an unverified digital signature of a transaction subchain in the currency certificate, iterative verification is performed on the digital signature of the remaining transaction subchain.

In a possible implementation, the method further includes verifying all transaction subchains in the currency certificate when no historical currency certificates having a same serial number as the currency certificate exist in the server.

In a possible implementation, verifying the transaction subchains includes verifying a digital signature, an institution signature, a balance, and a transaction record. It may be understood that the balance and the transaction record may be synchronized to the server with the currency certificate.

In a possible implementation, storing the data certificate that succeeds in the verification includes storing, based on the serial number, a verified subchain digital signature of a transaction subchain in the server as feature data.

Further, based on the foregoing digital signature solution of the chain structure, in a process of synchronizing the currency certificate to the server, the server verifies validity of the currency certificate. After validity verification succeeds, a digital signature value of each transaction subchain is used as a transaction feature, and verified transaction data is stored in a specific transaction tree structure. For example, after the currency certificate synchronized by a user succeeds in the verification performed by the server, the subchain digital signature of each transaction subchain of the currency certificate is stored in a database of the server. Currency certificates with different serial numbers may be stored in different transaction tree structures. The stored data is used as the history record and used as reference values for comparison and verification in a subsequent verification process. That is, in a process of verifying transaction subchain signatures of all currency certificates, verification does not need to be repeatedly performed on a signature that can be queried in the transaction tree structures of the database, but incremental verification needs to be performed on only a node that does not exist in the database, and the verified node is added to the transaction tree structure after the verification succeeds, for use in quick verification of a subsequent currency certificate.

In a digital currency circulation process, a currency certificate of a same serial number is continuously split and spread after transactions. Finally, there is some duplicate information in the currency certificate held by a plurality of users. In a synchronization process, verified transaction data is stored in a specific transaction tree structure, so that the duplicate information in the currency certificate held by different users can be verified through only simple data comparison without repeated signature verification, thereby reducing a pressure of digital signature verification on the server side.

According to a fourth aspect, an embodiment of this disclosure further provides a transaction verification apparatus for the method provided in the first aspect of this disclosure, and the apparatus has a function of implementing any method provided in the first aspect. The function may be implemented by hardware, or may be implemented by hardware by executing corresponding software. The hardware or the software includes one or more modules corresponding to the function. The apparatus may exist in a product form of a chip. The transaction verification apparatus may be the first electronic device, or may be a fixed or removable functional module disposed on the first electronic device.

According to a fifth aspect, an embodiment of this disclosure further provides a transaction verification apparatus for the method provided in the second aspect of this disclosure, and the apparatus has a function of implementing any method provided in the second aspect. The function may be implemented by hardware, or may be implemented by hardware by executing corresponding software. The hardware or the software includes one or more modules corresponding to the function. The apparatus may exist in a product form of a chip. The transaction verification apparatus may be the second electronic device, or may be a fixed or removable functional module disposed on the second electronic device.

According to a sixth aspect, an embodiment of this disclosure further provides a transaction verification apparatus for the method provided in the third aspect of this disclosure, and the apparatus has a function of implementing any method provided in the third aspect. The function may be implemented by hardware, or may be implemented by hardware by executing corresponding software. The hardware or the software includes one or more modules corresponding to the function. The apparatus may exist in a product form of a chip. The transaction verification apparatus may be a server, or may be a fixed or removable functional module disposed on the server.

According to a seventh aspect, an embodiment of this disclosure provides an electronic device. The electronic device includes one or more processors, a memory, and one or more computer programs, where the one or more computer programs are stored in the memory, and the one or more computer programs include instructions, and when the instructions are executed by the one or more processors, the electronic device is enabled to perform the method provided in any implementation of the first aspect, or when the instructions are executed by the one or more processors, the electronic device is enabled to perform the method provided in any implementation of the second aspect.

According to an eighth aspect, an embodiment of this disclosure provides a server. The server includes one or more processors, a memory, and one or more computer programs, where the one or more computer programs are stored in the memory, and the one or more computer programs include instructions, and when the instructions are executed by the one or more processors, the server is enabled to perform the method provided in any implementation of the third aspect.

According to a ninth aspect, an embodiment of this disclosure provides a transaction verification system. The system includes a first electronic device, a second electronic device, and a server, where the first electronic device is configured to perform operation steps of the method according to the first aspect, the second electronic device is configured to perform operation steps of the method according to the second aspect, and the server is configured to perform operation steps of the method according to the third aspect.

According to a tenth aspect, an embodiment of this disclosure provides a storage medium, including a computer program, where when running on one or more processors, the computer program is used to implement the method provided in any implementation of the first aspect, when running on one or more processors, the computer program is used to implement the method provided in any implementation of the second aspect, or when running on one or more processors, the computer program is used to implement the method provided in any implementation of the third aspect.

According to an eleventh aspect, an embodiment of this disclosure provides a computer program or a computer program product, where when running on one or more processors, the computer program or the computer program product is used to implement the method provided in any implementation of the first aspect, when running on one or more processors, the computer program or the computer program product is used to implement the method provided in any implementation of the second aspect, or when running on one or more processors, the computer program or the computer program product is used to implement the method provided in any implementation of the third aspect.

According to a twelfth aspect, an embodiment of this disclosure provides a chip system, including at least one processor and at least one interface circuit, where the at least one interface circuit is configured to perform a transceiver function, and send instructions to the at least one processor, and when the at least one processor executes the instructions, the at least one processor performs the methods provided in the first aspect to the third aspect and any possible implementation of the first aspect to the third aspect.

For technical effects brought by any design manner of the fourth aspect to the twelfth aspect, refer to the technical effects brought by different design manners of the first aspect, the second aspect, or the third aspect. Details are not described herein again.

BRIEF DESCRIPTION OF DRAWINGS

To describe the technical solutions in some embodiments of this disclosure more clearly, the following briefly introduces the accompanying drawings used in describing some embodiments. It is clear that the accompanying drawings in the following descriptions show some embodiments of this disclosure, and a person of ordinary skill in the art may still derive other drawings from these accompanying drawings without creative efforts.

FIG. 7 is a schematic diagram of a logical function of a terminal device according to an embodiment of this disclosure;

FIG. 8 is a schematic diagram of a logical structure of digital currency verification of an issuer on a cloud side according to an embodiment of this disclosure;

DESCRIPTION OF EMBODIMENTS

The following clearly describes the technical solutions in embodiments of this disclosure with reference to the accompanying drawings in embodiments of this disclosure. It is clear that the described embodiments are some but not all of embodiments of this disclosure. All other embodiments obtained by a person of ordinary skill in the art based on embodiments of this disclosure without creative efforts shall fall within the protection scope of this disclosure.

In the description of the embodiment of this disclosure, unless otherwise stated, "multiple" means two or more than two. The term "and/or" in this disclosure describes only an association relationship for describing associated objects and represents that three relationships may exist. For example, A and/or B may represent the following three cases Only A exists, both A and B exist, and only B exists.

Before embodiments of this disclosure are described, a digital currency verification manner in the conventional technology is simply described first to facilitate understanding of embodiments of this disclosure. The following uses a cloud-side system as an example to describe a function of a server, and uses a terminal-side system as an example to describe a function of an electronic device. The following uses an example in which a terminal device A is used as a first electronic device and a terminal device B is used as a second electronic device for description. When a subchain digital signature of a transaction subchain is described, the following uses a digital signature of a transaction subchain to replace the subchain digital signature of the transaction subchain.

The following describes a system architecture, a procedure, and the like of transaction verification by using digital currency verification as an example.

Figure 1:
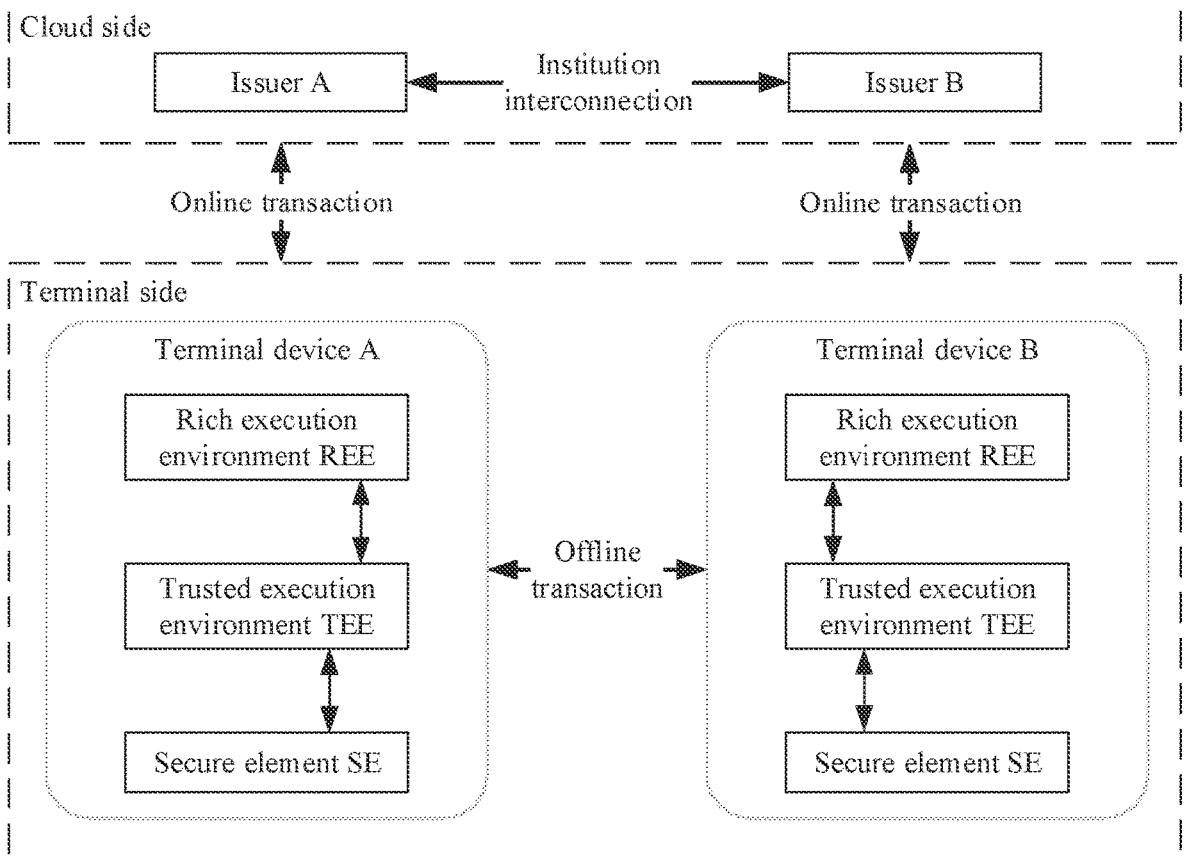
FIG. 1 is a schematic diagram of an architecture of a digital currency verification system according to an embodiment of this disclosure.

FIG. 1 is a schematic diagram of an architecture of a digital currency verification system according to an embodiment of this disclosure.

For example, the system in this embodiment of this disclosure mainly includes two parts a cloud-side system and a terminal-side system. Currency string synchronization or an online transaction may be performed between the cloud-side system and the terminal-side system.

Figure 2:
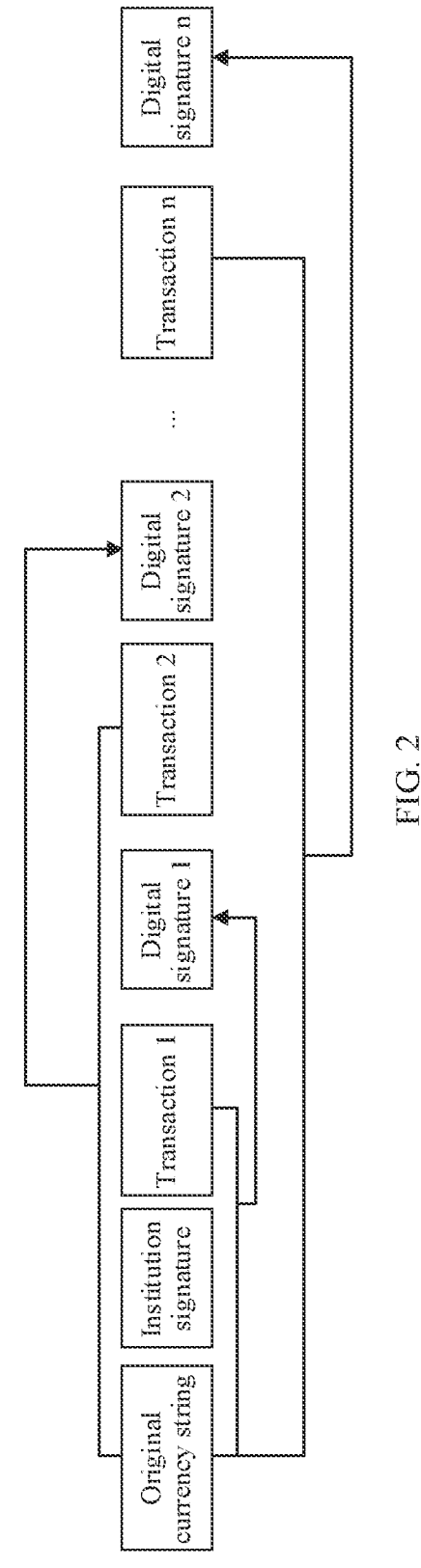
FIG. 2 is a schematic diagram of a structure of a currency certificate in the conventional technology.

The cloud-side system includes a background system of a digital currency issuer, used for functions such as currency certificate verification and synchronization of the issuer, where in FIG. 1, an issuer A and an issuer B are used as examples for presentation, and for example, the issuer may be a bank, and an institution interconnection and interworking platform of a central bank, where currency issuers are connected by the central bank, the platform is used for work such as transaction communication between institutions and audition performed by the central bank for the institutions, and in FIG. 2, institution interconnection is performed on the issuer A and the issuer B by the institution interconnection and interworking platform of the central bank.

The terminal-side system includes a security wallet application of a terminal device. FIG. 1 shows a terminal device A and a terminal device B as examples. It may be understood that the terminal device is an electronic device, and the electronic device includes but is not limited to a terminal device, a fixed electronic device, or a network device. The terminal device may be a mobile terminal device or a fixed terminal device. The electronic device may be an electronic device in the conventional technology, or may be an electronic device that appears in the future.

For example, the electronic device in this embodiment of this disclosure may be a mobile phone, a pad, a computer with a wireless transceiver function, a personal digital assistant (PDA), a smartwatch, a netbook, a wearable electronic device, an augmented reality (AR) device, a virtual reality (VR) device, a vehicle-mounted device, a wireless terminal in industrial control, a wireless terminal in self driving, a wireless terminal in remote medical, a wireless terminal in smart grid, a wireless terminal in transportation safety a wireless terminal in smart city, a wireless terminal in smart home, or an artificial intelligence (AI) terminal.

Embodiments of this disclosure provide a digital currency verification method, and the method may be applied to an electronic device. The following describes embodiments of this disclosure by using a terminal device as an electronic device. Technical solutions provided in embodiments of this disclosure are applicable to a terminal device that has an REE, a TEE, and an SE.

A rich execution environment REE module, also referred to as a common execution environment, is an execution environment of an operating system and various applications at an upper layer of the operating system. For example, a client wallet application implemented on the terminal device, also referred to as a soft wallet, runs in the REE of the terminal device.

A trusted execution environment TEE module is implemented based on an ARM TRUSTZONE technology. In this technology, a safe area is marked on a host processor of a mobile device (including a smart phone, a pad, a set-top box, a smart television, or the like), to ensure security, confidentiality, and integrity of code and data that are loaded into the environment. Execution space provided by the TEE has a higher level of security than that of space provided by a common mobile operating system (for example, LINUX or ANDROID). The TEE is usually used to run key operations: (1) mobile payment: fingerprint verification, personal identification number (PIN) input, and the like; (2) secure storage of confidential data such as a private key and a certificate; (3) content including digital right management (DRM); and the like. The TEE may provide a security service for the REE.

A secure element SE module is a microprocessor chip configured to store sensitive data and execute a secure application, and may be applied to scenarios such as identity authentication, digital signature, and secure storage. The secure element SE module is a hardware-based independent operating environment, does not share a system resource with a host machine, and has a highest security level. However, because the SE module has an independent operation unit, a processing capability is limited. Usually, an application of the SE module is a SIM card provided by an operator, an encrypted SD card of a security company, or an independent chip module built in a device.

Different terminal devices in the terminal-side system may perform an offline transaction. For example, the terminal device A and the terminal device B perform a dual offline transaction. The dual offline transaction represents a transaction generated by delivering a currency certificate by using only a terminal device when both two parties that perform a transaction by using a digital currency are in an offline state. In this transaction, a new transaction subchain is added to an end of an original currency certificate, the new transaction subchain marks an amount of the current transaction, and the amount of the transaction subchain at the end indicates a value of a new currency certificate.

Based on the system architecture shown in FIG. 1, the following describes a procedure of generating and verifying a digital signature of a digital currency in the conventional technology.

FIG. 2 is a schematic diagram of a structure of a currency certificate in the conventional technology.

Further, an original currency string includes necessary information such as an amount, a currency issuer, and a serial number when a currency is issued, and is signed by the currency issuer. With currency circulation, transaction subchains are continuously added to an end, and all data is signed at an end of each transaction. A digital certificate structure of the currency is a sequence structure including the original currency string and the transaction subchain. A new transaction subchain is generated during certificate delivery, and a digital signature is added to ensure data integrity and validity.

For example, as shown in FIG. 2, based on the original currency string, after a transaction is performed, a digital signature 1 that is generated on a terminal side based on data of the original currency string and data of the current transaction is used to describe validity of a transaction subchain 1, where a transaction 1 and the digital signature 1 constitute the transaction subchain 1. After a second transaction is performed, a digital signature 2 is generated based on the original currency string, the transaction subchain 1, and data related to the second transaction, to describe validity of a transaction subchain 2, where the transaction subchain 2 includes the digital signature 2 and a transaction 2 and the digital signature 2 constitute the transaction subchain 2. The rest can be done in a similar manner.

In the conventional technology, each digital signature needs to be generated by performing overall signature on all preorder transaction data. Consequently, there is redundant digest computation in a process of generating a digital signature for a currency certificate. In this implementation, a signature manner for a transaction subchain of a currency certificate is that all data is signed. Consequently, digital signatures need to be verified layer by layer in a process of verifying the currency certificate, and redundant computation also exists in a digest computation procedure in the digital signature verification process.

Figure 3:
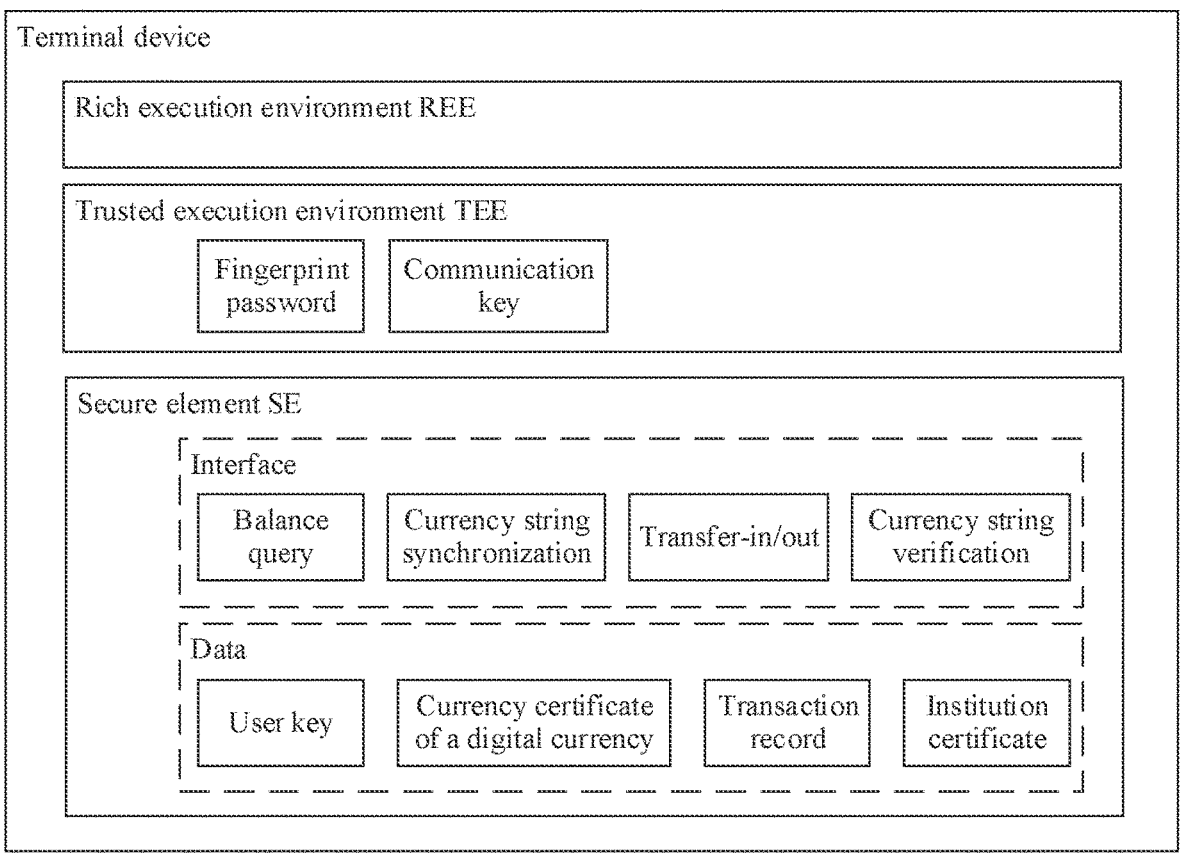
FIG. 3 is a schematic diagram of a logical function of a terminal device in the conventional technology.

FIG. 3 is a schematic diagram of a logical function of a terminal device in the conventional technology.

Further, in a digital currency scenario, hard wallet logic of the terminal device is mainly implemented by an Applet on an SE side, and an interface and data required for a hard wallet transaction procedure are defined on the SE side. Main interface functions include balance query, currency string synchronization, transfer-in/out, currency string verification, and the like, and main data includes a user key, a currency certificate of a digital currency, a transaction record, an institution certificate, and the like, where the user key is used to identify identities of two transaction parties.

A TEE is used to store only simple user identity information such as a fingerprint password, a face, and a communication key, where the communication key is used to encrypt a channel during inter-device communication.

The following uses a transfer transaction as an example to describe a service procedure including payment and collection.

Figure 4:
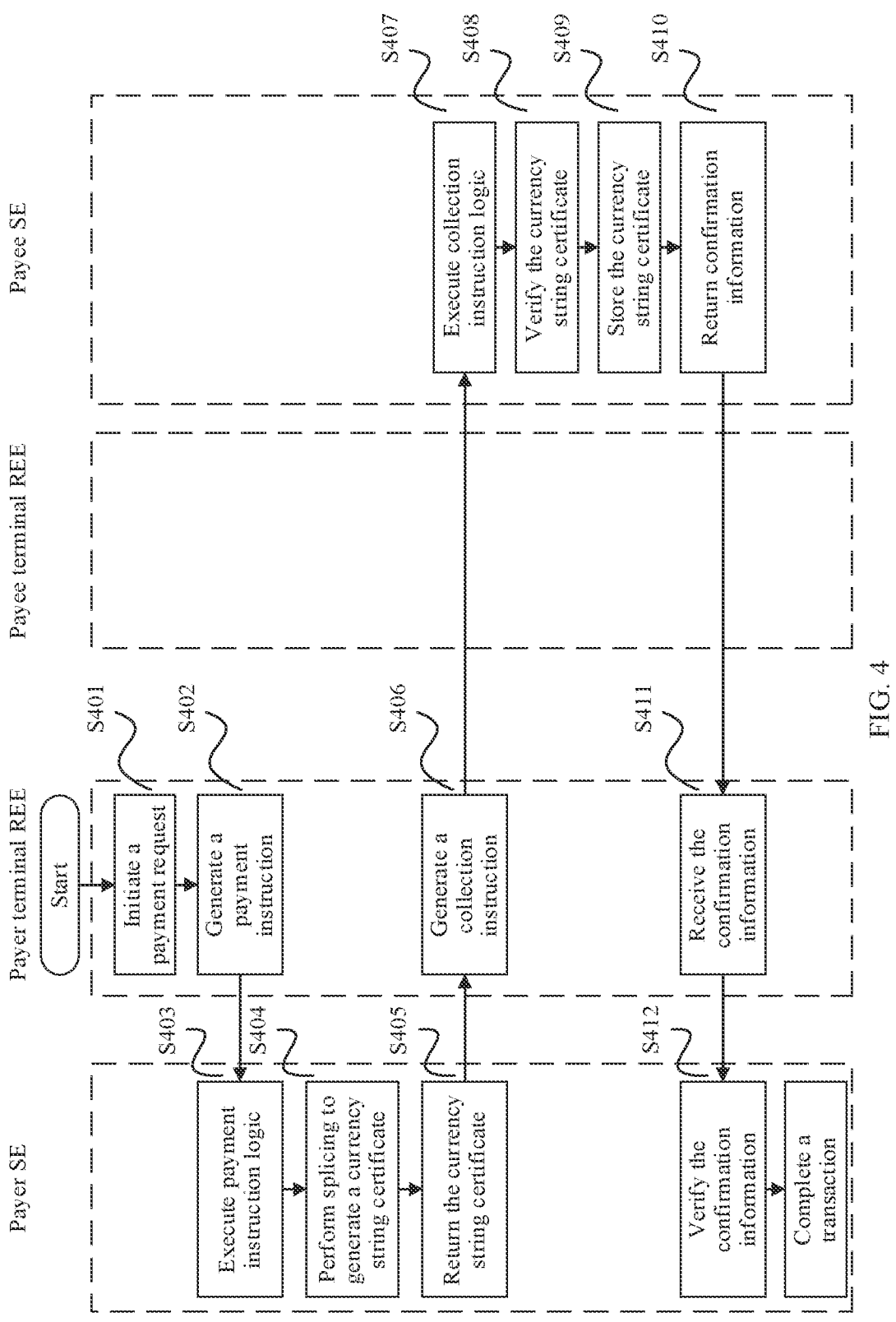
FIG. 4 is a schematic flowchart of a dual offline transaction on a terminal side in the conventional technology.

FIG. 4 is a schematic flowchart of a dual offline transaction on a terminal side in the conventional technology. Specific steps are as follows Steps S401 and S402: A payer user initiates a payment request at a soft wallet of an REE, and the REE generates a payment instruction for interaction with an SE.

Step S403: The payer SE receives the payment instruction, and executes corresponding logic for a transaction, for example, performs balance verification.

Steps S404 and S405: The payer SE splices a transaction subchain at an end of a currency certificate to generate a new currency certificate, and returns the currency certificate to the REE.

Step S406: The payer REE generates a collection instruction based on the new currency certificate, and sends the collection instruction to a payee.

Step S407: A payee REE transparently transmits the collection instruction to an SE.

Steps S408 and S409: The payee SE verifies the currency certificate, and locally stores the currency certificate after the currency certificate succeeds in the verification.

Steps S410 to S412: The payee returns transaction confirmation information, and the payer receives the transaction confirmation information to complete a transaction.

Figure 5:
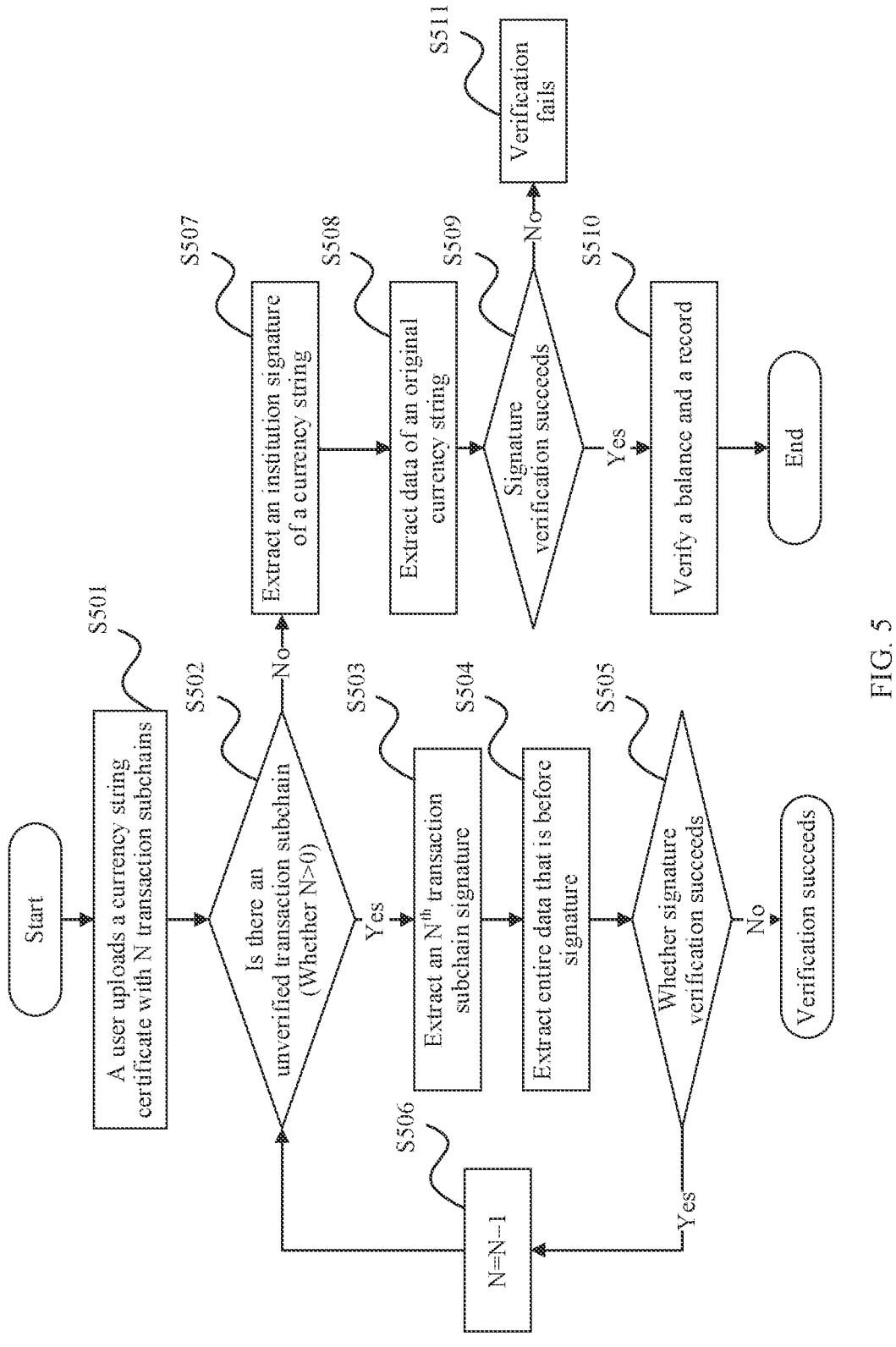
FIG. 5 is a schematic flowchart of a method in which a cloud server verifies a digital currency in the conventional technology.

FIG. 5 is a schematic flowchart of a method in which a cloud server verifies a digital currency in the conventional technology. Specific steps are as follows.

Step S501: A terminal user connects to an issuer server, and uploads a currency certificate with N transaction subchains, and a balance and transaction record data that are related to the currency string.

Steps S502 to S506: The cloud server parses data of the currency certificate, extracts digital signatures of the transaction subchains in the currency certificate from back to front, and sequentially uses a corresponding signature algorithm, for example, an international data encryption algorithm, for verification.

Steps S507 and S508: After verification of the signatures of all the transaction subchains succeeds, extract an institution signature of an original currency string and data of the original currency string, and verify validity of the original currency string based on the institution signature of the original currency string and the data of the original currency string, where if the institution signature of the original currency string fails in verification, it indicates that the verification procedure fails, and as shown in a step S511, the procedure ends.

Steps S509 and S510: After the institution signature of the original currency string succeeds in the verification, verify validity of the balance and the record, where if validity verification succeeds, it indicates that the currency certificate is valid, and the verification procedure ends.

In the conventional technology described above, online and offline transaction functions of a digital currency can be effectively implemented, and validity and security problems of an offline currency certificate are resolved. However, there are still deficiencies such as specific redundant computation in a verification process and poor user experience due to limited performance. Causes of these deficiencies are as follows.

It is analyzed from the terminal side that one transaction subchain is added each time the currency certificate is delivered, and digital signature needs to be performed on all certificate data each time the transaction subchain is added. This brings a pressure to signature verification on the terminal side. Hard wallet logic of the terminal device is mainly implemented in the SE, and the TEE is used to store only simple user identity information such as a fingerprint and a face. The terminal SE is a hardware-isolated independent operating environment, and storage space and computing performance are limited. Security of the terminal-side TEE is slightly lower than that of the SE, but performance of the terminal-side TEE is far higher than that of the SE. Most service logic is implemented in the SE. In the TEE, only a simple function is implemented, and the performance is not fully utilized.

It is analyzed from the server side that, in the process in which the server terminal verifies the currency certificate, because a signature manner of the transaction subchains of the currency certificate is that all data is signed, the signatures need to be verified layer by layer in the verification process, and redundant computation exists in a digest computation procedure in the signature verification process. In addition, in a digital currency circulation process, a currency string of a same serial number is spread to different user terminals, some duplicate information inevitably exists in the currency certificate of different users, and there is repeated transaction subchain signature verification after the different users upload the currency certificate.

Embodiments of this disclosure provide a digital currency verification method for the foregoing problems. The method is based on the system architecture shown in FIG. 1, and the method mainly includes the following technical points.

1. A digital signature of a currency certificate uses a chain structure: A transaction subchain is generated for each transaction as transactions are performed, where a digital signature in each transaction subchain is a digital signature generated based on a signature result of a previous transaction and data of a current transaction, that is, Signature(n) =Sign(Signature(n−1)+transaction(n)). Signature(n−1) identifies a digital signature generated for the previous transaction of the current transaction, and transaction(n) represents information related to the current transaction. It may be understood that an incremental chain signature structure is formed in this signature manner.

2. Because the currency certificate is of the chain structure, a digital signature of a last transaction subchain may be used to verify integrity and validity of overall information of the currency certificate. Therefore, in an interaction process on a terminal side, service logic on an SE side is transferred to a TEE side for execution, and a digital signature verification process that ensures transaction validity is reserved in the SE.

3. After receiving the currency certificate synchronized by the terminal side, a cloud server side constructs a currency certificate transaction tree, and stores, in a tree-shaped structure, a digital signature of a transaction subchain that succeeds in verification. In a verification process, incremental verification is performed on the digital signature of the transaction subchain. In a process of verifying transaction subchain signatures of all currency certificates, verification does not need to be repeatedly performed on a signature that can be queried in transaction tree structures of a database, but incremental verification needs to be performed on only a node that does not exist in the database, and the verified node is added to the transaction tree structure after the verification succeeds, for use in quick verification of a subsequent currency certificate.

Figure 6:
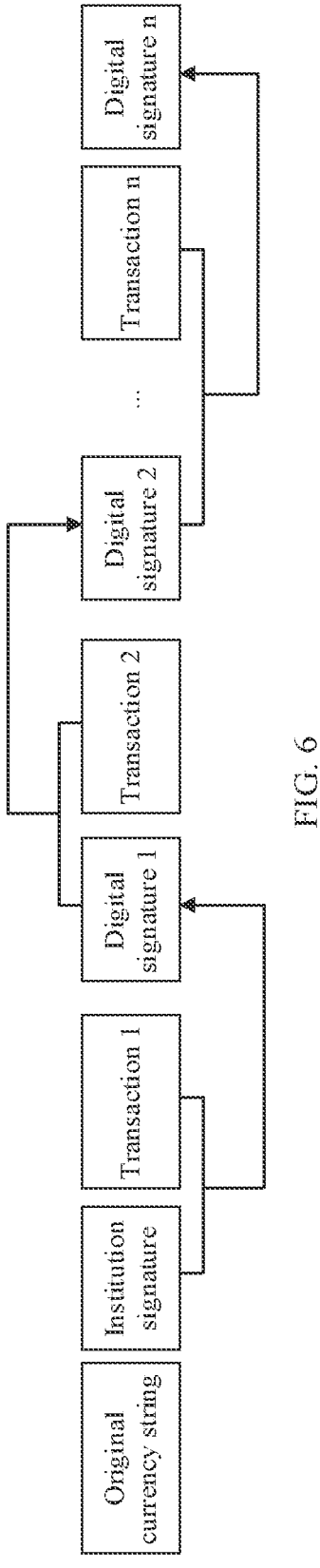
FIG. 6 is a schematic diagram of a structure of a currency certificate according to an embodiment of this disclosure.

FIG. 6 is a schematic diagram of a structure of a currency certificate according to an embodiment of this disclosure.

A transaction subchain is generated for each transaction as transactions are performed, where a digital signature in each transaction subchain is a digital signature generated based on a signature result of a previous transaction and data of a current transaction, that is, Signature(n)=Sign(Signature(n−1)+transaction(n)). Signature(n−1) identifies a digital signature generated for the previous transaction of the current transaction, and transaction(n) represents information related to the current transaction. It may be understood that an incremental chain signature structure is formed in this signature manner.

For example, as shown in FIG. 6, based on an original currency string, after a transaction is performed, a digital signature 1 that is generated on a terminal side based on data of the original currency string and data of the current transaction is used to describe validity of a transaction subchain 1, where a transaction 1 and the digital signature 1 constitute the transaction subchain 1. After a second transaction is performed, a digital signature 2 is generated based on the digital signature 1 and data related to the second transaction, to describe validity of a transaction subchain 2, where a transaction 2 and the digital signature 2 constitute the transaction subchain 2. The rest can be done in a similar manner.

Herein, to facilitate description of a principle of a chain signature, a digital signature in a transaction subchain and an institution signature in an original currency string are separately presented. In an implementation process, the transaction subchain may include a digital signature, and the original currency string may include an institution signature.

An overall signature solution is replaced with the chain signature solution. Therefore, redundant digest computation is reduced in a process of generating the digital signature for the currency certificate and verifying the digital signature, thereby improving performance of currency certificate generation and verification on the terminal side, improving user experience on the terminal side, and ensuring validity and integrity of the entire certificate.

FIG. 7 is a schematic diagram of a logical function of a terminal device according to an embodiment of this disclosure.

For example, the terminal device includes an REE, a TEE, and an SE.

In the terminal device, the trusted execution environment TEE implements most logic in a digital currency transaction procedure, including balance query, currency string synchronization, transfer-in/out, and the like, and further has stored a fingerprint password, a communication key, an institution certificate, a digital currency string, a transaction record, and the like. Computing performance and storage space of the TEE are superior to those of the SE. Therefore, performance on the terminal side can be fully utilized to improve user experience.

An interface and data required for a hard wallet transaction procedure are defined in the secure element SE. The interface is mainly used to verify a digital signature of a transaction subchain at an end of a currency certificate, and is used by a payee to verify validity of the transferred currency certificate, and the data is mainly the digital signature of the transaction subchain at the end of the currency certificate, and is used by a payer to ensure that a currency string on the TEE side is not tampered with before a transaction. When data of the currency certificate of the payer TEE is tampered with, the digital signature of the transaction subchain at the end changes. After the currency certificate is transferred to the SE, it is found that the digital signature is not consistent with the digital signature stored when the SE receives the currency certificate, and verification fails. When receiving the valid currency certificate, the payee verifies the digital signature of the transaction subchain at the end in the SE. After verification of the digital signature succeeds, the digital signature that is of the transaction subchain at the end and that corresponds to the currency certificate is stored in the SE. Therefore, transaction security is still ensured by the SE, but performance is greatly improved by using the TEE.

FIG. 8 is a schematic diagram of a logical structure of digital currency verification of an issuer on a cloud side according to an embodiment of this disclosure.

In the issuer, functions of logical modules are as follows

Currency certificate parsing: Content of each part of a currency certificate is parsed from data uploaded by a user, and an institution signature and a digital signature of a transaction subchain are mainly extracted.

Digital signature verification: Validity of all digital signatures of a currency certificate is verified according to a chain signature method in a solution of the present application, and a verified digital signature is stored in a storage structure of a transaction tree.

Transaction tree storage: When a digital currency is uploaded to a background of an issuer, a tree-shaped structure that represents digital signature information and that includes nodes is generated based on each unique serial number, a traversal path from a tree root to a specific leaf node represents a transaction chain of one currency certificate, and after a plurality of users who hold currency strings of a same serial number synchronously operate, a formed tree-shaped structure represents an entire circulation and delivery process of an original currency string.

Serial number query: Corresponding verification data, namely, a transaction tree related to a serial number, is queried in a storage of a background of an issuer based on the serial number of a currency certificate.

Digital signature comparison Digital signature data in a currency certificate is traversed, and is compared with a node that is of a transaction tree and that succeeds in verification. If unverified nodes are found, incremental verification is performed on these nodes.

Figure 9A:
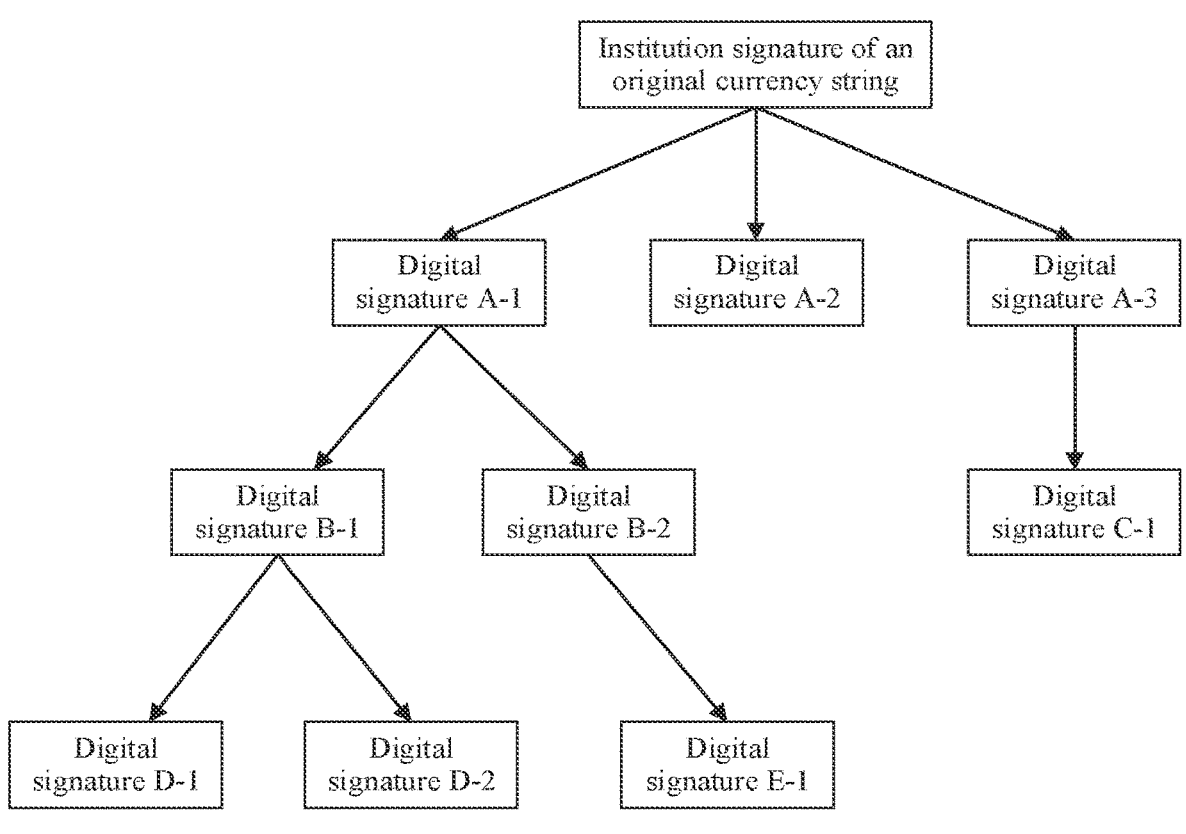
FIG. 9A is a schematic diagram of a structure in which a server stores a digital signature of a currency certificate according to an embodiment of this disclosure.

FIG. 9A is a schematic diagram of a structure in which a server stores a digital signature of a currency certificate according to an embodiment of this disclosure.

A currency certificate of a same serial number forms a topology as shown in FIG. 9A in a digital currency circulation process because of a delivery mechanism of a currency certificate. A digital signature x-n represents a digital signature generated when a payer x uses the currency certificate for an nth payment transaction, and a private key of the payer x is used.

When a plurality of users synchronize the currency certificate and verify validity of the currency certificate on a server terminal, a tree-shaped structure shown in the figure is constructed and stored in a database, each node is a digital signature value of a corresponding transaction subchain, and a relationship between a parent node and a child node is determined in a chain signature manner previously defined by the currency certificate.

For example, a specific incremental verification method is as follows

For example, the currency certificate passes through users A, B, D, and F: A->B->D->F, and the user D and the user F separately successively synchronize the currency certificate online to a cloud-side server.

Figure 9B:
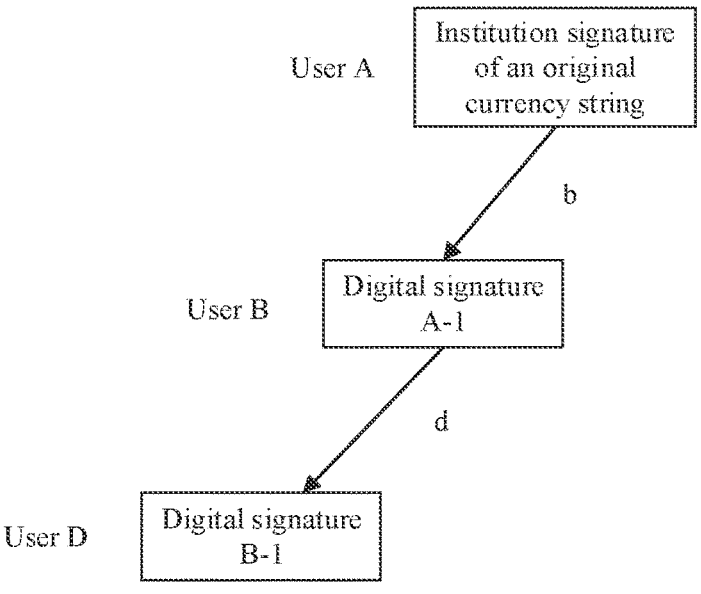
FIG. 9B is a schematic diagram of a transaction branch according to an embodiment of this disclosure.

FIG. 9B is a schematic diagram of a transaction branch according to an embodiment of this disclosure.

A transaction branch is formed as shown in FIG. 9B after the user D synchronizes the currency certificate, where a connection line b represents a transaction in which the user A pays the user B, and a connection line d represents a transaction in which the user B pays the user D. When the transaction branch is generated for the first time, complete validity verification needs to be performed. Verification content includes verifying an institution signature of an original currency string, verifying a digital signature A-1 based on content of the transaction subchain b and the institution signature, and verifying a digital signature B-1 based on content of the transaction subchain d and the digital signature A-1. Similarly, if there is a longer transaction subchain, iterative verification may be performed on a signature.

Figure 9C:
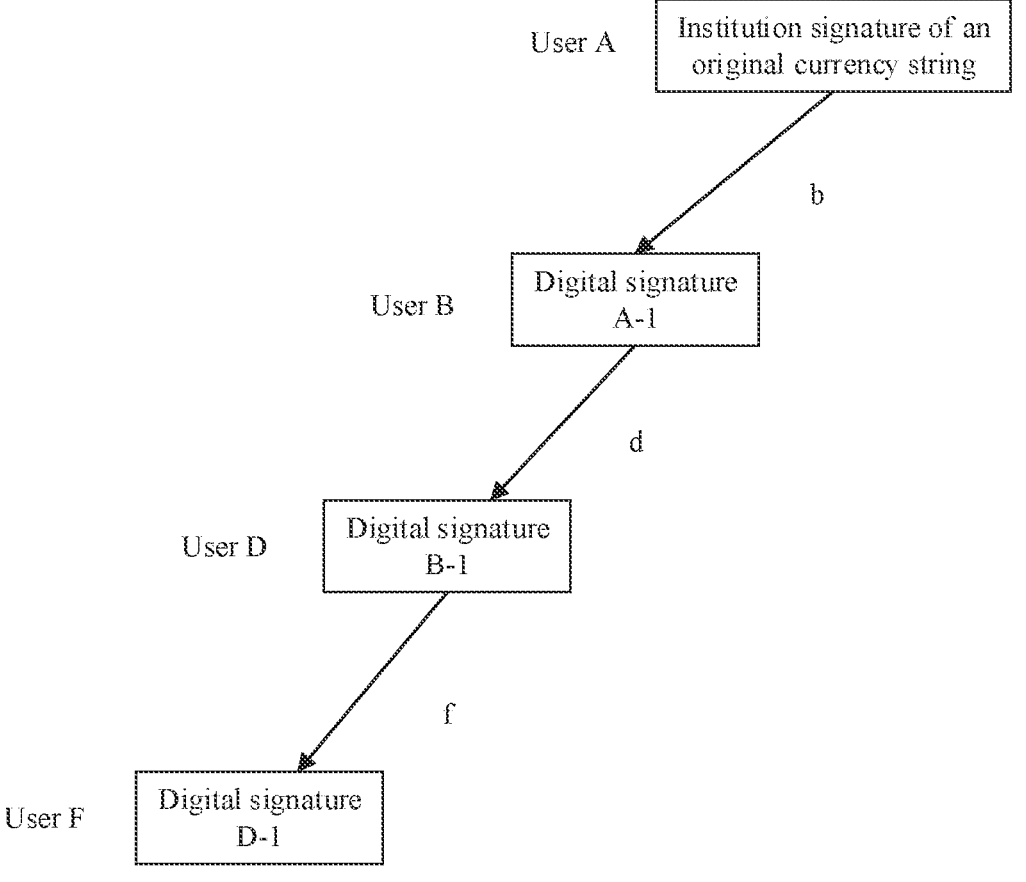
FIG. 9C is a schematic diagram of another transaction branch according to an embodiment of this disclosure.

FIG. 9C is a schematic diagram of another transaction branch according to an embodiment of this disclosure. A transaction branch is formed as shown in FIG. 9C after the user F synchronizes the currency certificate. It can be determined, through simple signature value comparison, that the transaction branches b and d are verified based on the currency certificate uploaded by the user D and are valid, and for digital signature verification of the user F, only a transaction f in which the user D pays the user F and a digital signature D-1 need to be verified.

Based on the foregoing schematic diagram of the architecture and the foregoing schematic diagram of the structure of the currency certificate, the following performs detailed description by using two specific embodiments.

Figure 10:
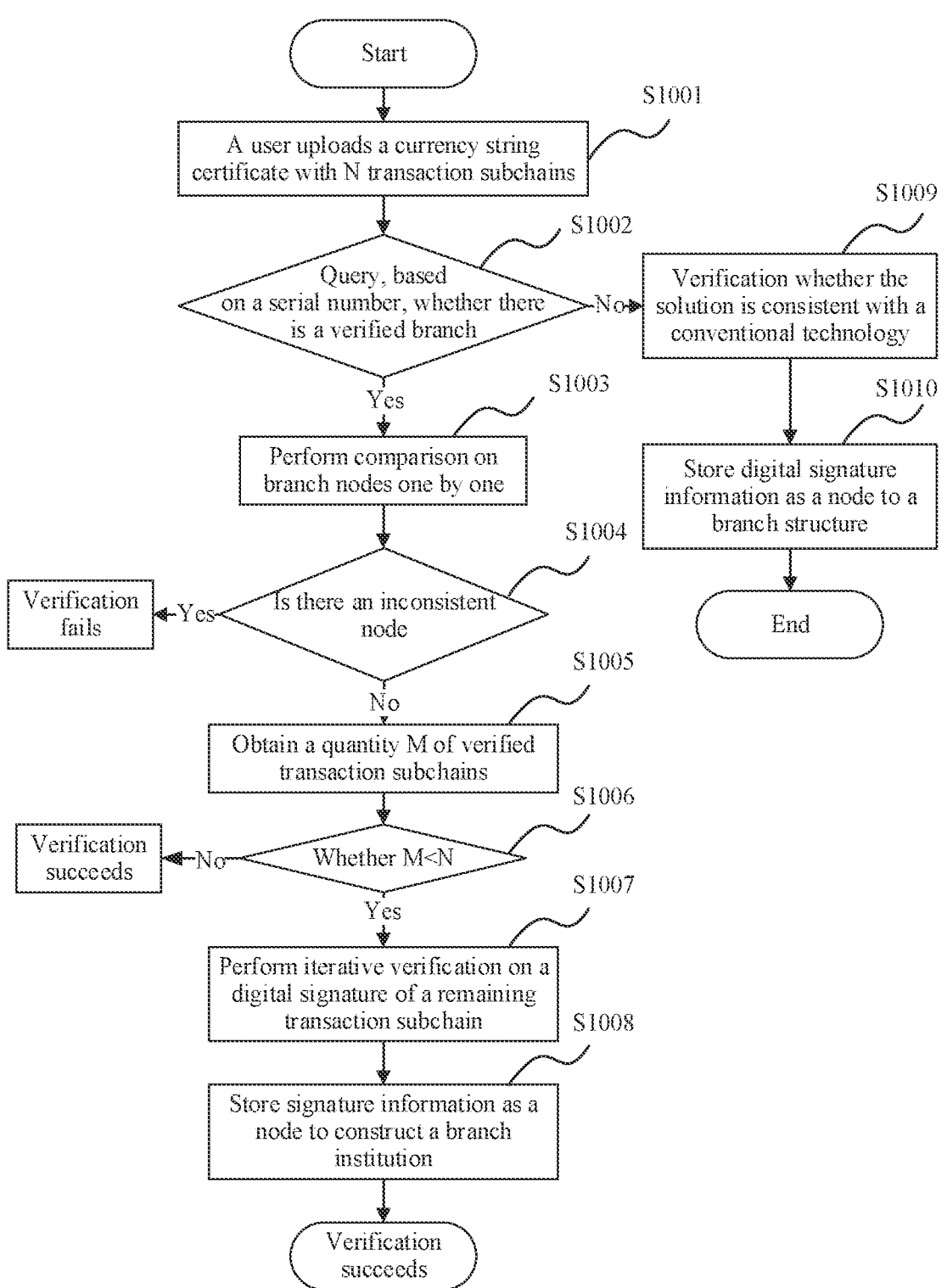
FIG. 10 is a schematic flowchart in which a server verifies a digital currency according to an embodiment of this disclosure.

FIG. 10 is a schematic flowchart in which a server verifies a digital current according to an embodiment of this disclosure. The method may include a step S1001 to a step S1010 as follows.

Step S1001: A user uploads a currency certificate to a server of an issuer during synchronization.

In this step, the user needs to upload, to a corresponding issuer for verification and based on information in an original currency string, the currency certificate that is in a wallet and that needs to be synchronized. The information about the original currency string described herein may include an issuer identifier, a currency string amount, an institution certificate, an institution reserved field, and the like. In this step, each currency certificate needs to carry complete information, including an amount of the original currency string, an issuer certificate, an institution signature, and a transaction subchain generated for each transaction, where each transaction subchain further includes a transaction amount, and transaction information, and the transaction information includes a transaction index, a payer public key, a payer signature, and the like. A quantity of transaction subchains of one currency certificate is declared to be N.

Step S1002: Query corresponding verification data based on a serial number of a currency string.

This step is performed before a digital signature of the currency certificate is verified. First, serial number information is extracted from the currency certificate, and a record indicating that the serial number is verified is queried in a database.

If there is no record indicating that the serial number is verified, steps S1009 and S1010 are performed. To be specific, digital signatures of the transaction subchains are verified one by one in a manner consistent with an existing solution. For a specific procedure, refer to FIG. 5. Then digital signature data of each transaction subchain is used as a node to construct a branch structure starting from an institution signature of the original currency string, for quick verification of a subsequent currency certificate. In this case, a procedure ends.

If there is a record indicating that the serial number is verified, steps S1003 to S1008 are performed.

Step S1003: Compare the digital signatures of the currency certificate with the verified digital signatures that are stored in branch nodes. In this step, digital signature data of the currency certificate needs to be traversed starting from the institution signature of the original currency string, and be compared with verified data of the branch nodes.

Step S1004: Determine whether there is an inconsistent node: if there is a node with inconsistent data, the currency certificate fails in verification, and a procedure ends, otherwise, steps S1005 to S1008 are performed.

Steps S1005 to S1008: Obtain a quantity M of verified transaction subchains: if M≥N, the digital signatures of all the transaction subchains of the currency certificate are consistent, the currency certificate is valid, the verification succeeds, and a procedure ends, or if M<N, it indicates that an unverified digital signature of a transaction subchain still exists in the currency certificate, iterative verification is performed on the digital signature of the remaining transaction subchain, and the digital signature that is of the transaction subchain and that succeeds in the verification is stored in an added branch node, for quick verification of a subsequent currency certificate. After all the digital signatures are verified to be valid, it is proved that the currency certificate is valid, and another verification procedure may be performed, for example, record verification or balance verification.

Figure 11A:
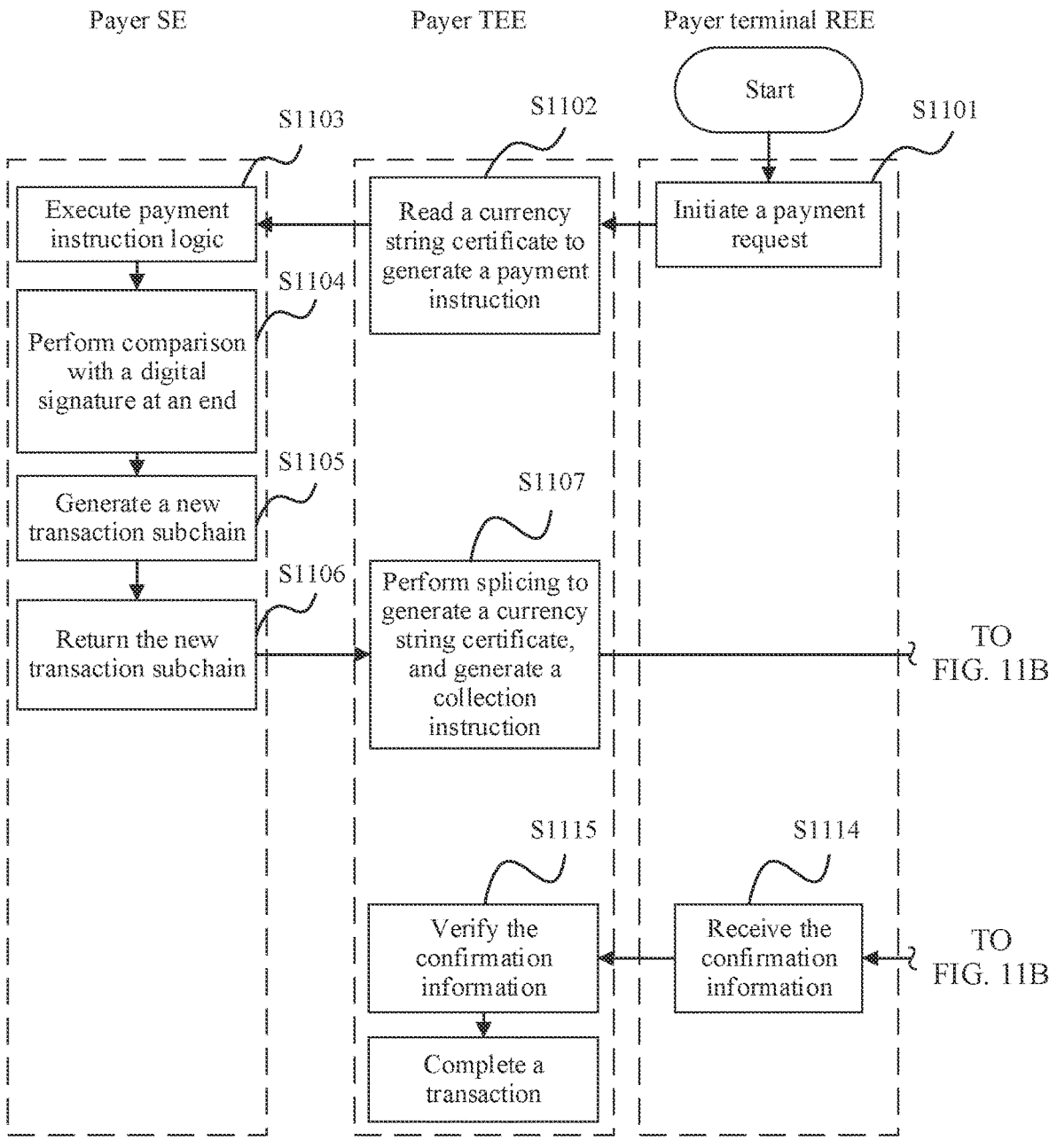
FIG. 11A to FIG. 11B are a schematic flowchart of a dual offline transaction on a terminal side according to an embodiment of this disclosure.
Figure 11B:
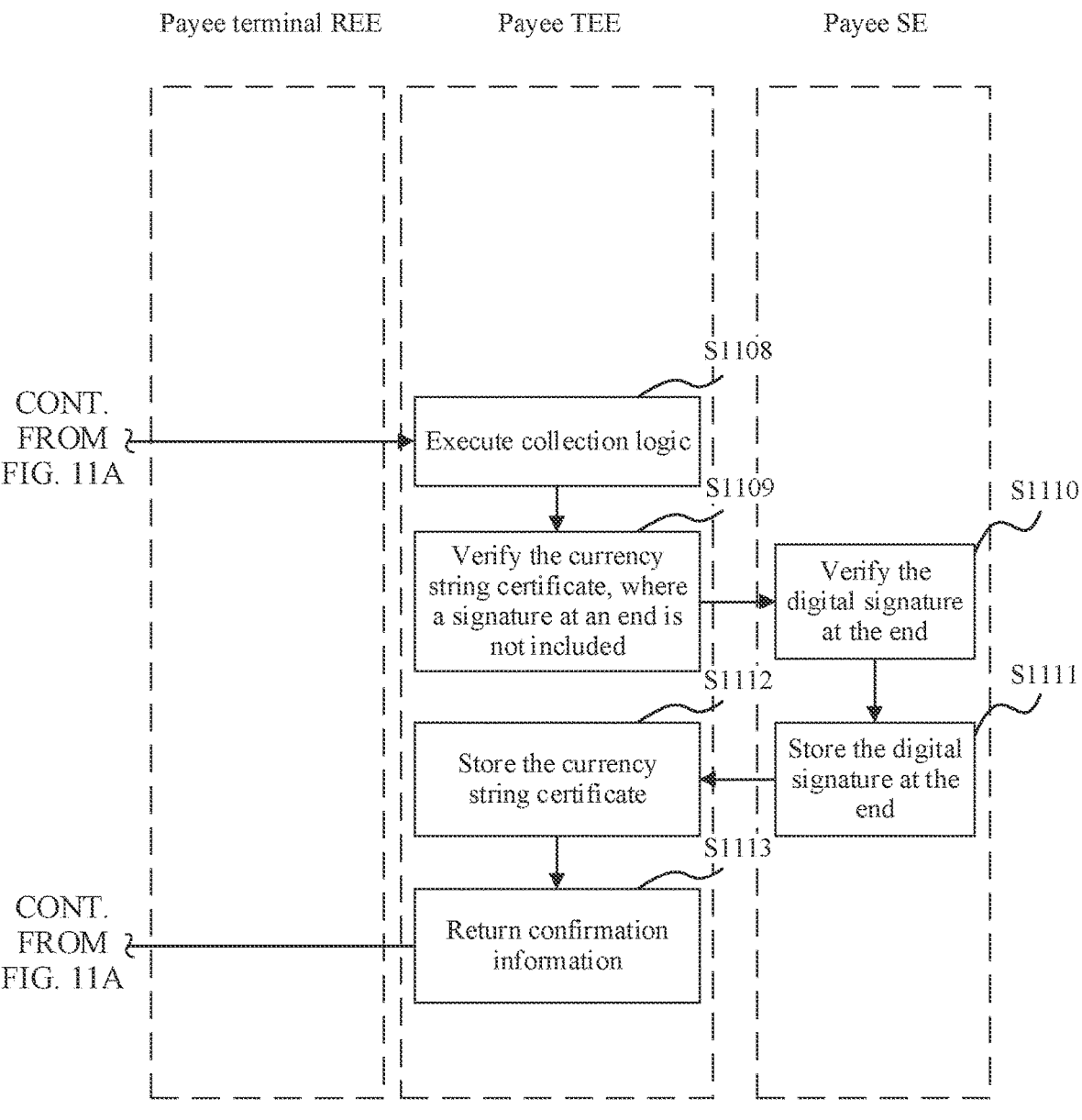

FIG. 11A to FIG. 11B are a schematic flowchart of a dual offline transaction on a terminal side according to an embodiment of this disclosure. The procedure includes a schematic flowchart of an offline transaction between two terminal devices. In an actual application process, another scenario is further included, for example, an online procedure or a single offline procedure (including an online payer and an offline payee, or an offline payer and an online payee). It may be understood that, when an actual application scenario is a single offline procedure, local processing of a procedure of a payer or a payee is separately the same as processing of a payer or a payee in a dual offline procedure.

Specific steps are as follows.

Step S1101: A user operates at a wallet App on an REE side to initiate a payment request.

In this step, the payer user negotiates a target address of a payee through another channel, and sends the payment request to a TEE through a corresponding TEE interface.

Step S1102: The payer TEE reads a currency certificate stored in the TEE to generate a payment instruction.

In this step, the TEE selects a proper currency string based on a payment amount, extracts a digital signature at an end of the currency certificate after basic verification in the TEE, and sends the digital signature to an SE. The basic verification includes verifying whether a transaction amount is valid, or verifying whether initialized quota information such as a wallet quota, a transaction quantity, and a transaction quota is valid. The quota information may be stored in the TEE or the SE. If the quota information is stored in the SE, the quota information may be read by the TEE from the SE for verification by the TEE. The transaction quantity may be determined based on a quantity of transaction subchains or a length of the currency certificate.

Step S1103: The payer SE executes payment instruction logic.

Step S1104: The payer SE compares the digital signature received from the TEE with a digital signature that is of a transaction subchain at an end and that is stored after passing last transaction verification, where if the digital signature of a transaction subchain at an end in the current transaction is consistent with the digital signature in the SE, it may be proved that currency string data in the TEE is not tampered with because the digital signature that is of the transaction subchain at the end and that is stored in the SE is not modified in the SE after a last transaction.

Steps S1105 and S1106: The payer SE generates a new transaction subchain, and returns the new transaction subchain to the payer TEE.

In this step, transaction subchain data is generated based on a transaction amount required by the payer for the current transaction and a random number or another reserved field, a new transaction signature is generated based on the digital signature of the transaction subchain at the end in a last transaction and subchain data of the current transaction, and finally, transaction information and the digital signature are spliced into the new transaction subchain and the new transaction subchain is returned to the TEE, where the SE generates the transaction information based on the transaction amount.

Step S1107: The payer TEE splices, to the original currency certificate, the new transaction subchain returned by the SE, and generates a collection instruction and sends the collection instruction to the payee.

Step S1108: A payee REE transparently transmits a collection request to a TEE, and after receiving the collection request, the TEE executes collection logic, and extracts all data of the currency certificate from the collection request.

Steps S1109 to S1113: The payee cooperatively verifies the currency certificate in the TEE and an SE.

In this disclosure, a signature verification instruction is delivered, and includes only a signature at an end. In this case, only a newly generated currency string signature has been stored.

An instruction in the conventional technology is a collection instruction, and includes an entire currency string. At first, an SE has stored the entire currency string.

In this step, the payee executes most currency string verification logic in the TEE, including institution signature verification and balance verification of the original currency string, and digital signature verification of the transaction subchain. When the digital signature of the transaction subchain at the end is verified, information required for verifying the signature at the end is transferred to the SE by using a verification instruction, for verification, where the information required for verifying the signature at the end includes a digital signature of a penultimate transaction subchain, information about the transaction subchain at the end, and the digital signature of the transaction subchain at the end, and the digital signature of the transaction subchain at the end. After passing the verification in the SE, the digital signature of the transaction subchain at the end is stored in the SE for comparison and verification in a subsequent transaction before payment, and a verification result is returned to the TEE. The TEE confirms the verification result, locally stores a new currency certificate in the TEE, and sends confirmation information to the payer after the verification succeeds.

Steps S1114 and S1115: The payer receives the confirmation information, and verifies the confirmation information to complete the transaction. When an amount of the currency string is used up, the currency string is marked with a currency string deletion identifier. Subsequently, when the currency certificate is synchronized to a server, the server deletes the currency certificate based on the identifier. It may be understood that the confirmation information herein is an example of the second transaction response message in the summary.

The foregoing describes in detail the digital currency verification method provided in embodiments of this disclosure.

The foregoing mainly describes the solutions provided in embodiments of this disclosure from the perspective of the methods. It may be understood that, to implement the foregoing functions, a digital currency verification apparatus includes corresponding hardware structures and/or software modules for performing the functions. A person skilled in the art should easily be aware that, in combination with units and algorithm steps of the examples described in embodiments disclosed in this specification, this disclosure can be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this disclosure.

In this embodiment of this disclosure, the digital currency verification apparatus may be divided into functional units based on the foregoing method examples. For example, each functional unit may be divided corresponding to each function, or two or more functions may be integrated in one processing unit. The integrated unit may be implemented in a form of hardware, or may be implemented in a form of a software function unit. It should be noted that, in embodiments of this disclosure, division into the units is an example, and is merely logical function division. During actual implementation, another division manner may be used.

Figure 12:
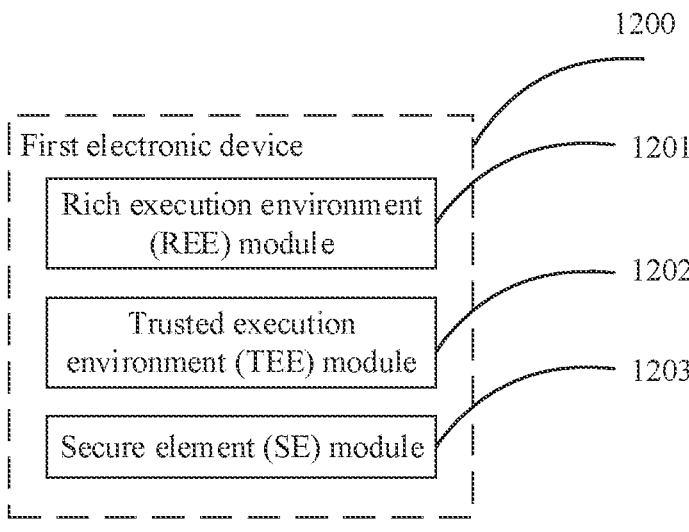
FIG. 12 is a schematic diagram of an apparatus of a first electronic device according to an embodiment of this disclosure.

In an example, when each functional unit is divided corresponding to each function, FIG. 12 is a schematic diagram of an apparatus of a first electronic device according to an embodiment of this disclosure. The apparatus 1200 includes a rich execution environment (REE) module 1201, a trusted execution environment (TEE) module 1202, and a secure element SE module 1203.

The rich execution environment module 1201 is configured to send a first transaction request message to the trusted execution environment module, where the first transaction request message includes a transaction type of a transaction and a receiver identifier of the transaction.

The trusted execution environment module 1202 is configured to execute first service logic based on the transaction type to obtain a first verification instruction, and send the first verification instruction to the secure element module 1203, where the first verification instruction includes a digital signature.

The secure element module 1203 is configured to verify validity of the transaction based on the digital signature to obtain a first verification result, and send the first verification result to the trusted execution environment module.

The trusted execution environment module 1202 is further configured to send a first transaction response message to the rich execution environment module, where the first transaction response message includes the first verification result.

The rich execution environment module 1201 is further configured to send a second transaction request message to the second electronic device based on the receiver identifier.

In a possible design, the trusted execution environment module 1202 is further configured to store at least one data certificate, and execute the first service logic based on the transaction type and the at least one data certificate.

In a possible design, the data certificate includes a currency certificate, the currency certificate includes an original currency string or an original currency string and at least one transaction subchain, the transaction subchain includes a digital signature, the digital signature is used to indicate validity of the transaction subchain, and the original currency string includes an amount of the original currency string, an issuer certificate, and an institution signature.

In a possible design, the first transaction request message further includes a transaction amount. The trusted execution environment module 1202 is further configured to select at least one currency certificate from the at least one currency certificate based on the transaction type and the transaction amount, perform basic verification on the selected at least one currency certificate, where the basic verification includes transaction quantity or transaction quota verification, and after the at least one currency certificate succeeds in the basic verification, extract a digital signature of a last transaction subchain of each currency certificate in the at least one currency certificate, and generate the first verification instruction including the digital signature of the last transaction subchain of each currency certificate and the transaction amount.

In a possible design, the currency certificate includes a serial number, and the serial number is a unique identifier of the currency certificate. The secure element module 1203 is further configured to generate transaction information based on the transaction amount in the first verification instruction, compare a locally stored signature with the digital signature of the last transaction subchain in the first verification instruction based on the serial number, and when the locally stored signature is consistent with the digital signature of the last transaction subchain in the first verification instruction, generate a second digital signature based on the transaction information, the digital signature of the last transaction subchain, and a locally stored private key, generate a new transaction subchain based on the second digital signature and the transaction information, and generate the first verification result including the new transaction subchain.

In a possible design, the trusted execution environment module 1202 is further configured to update the new transaction subchain to the currency certificate based on the serial number.

In a possible design, the rich execution environment module 1203 is further configured to synchronize the data certificate to a server.

Figure 13:
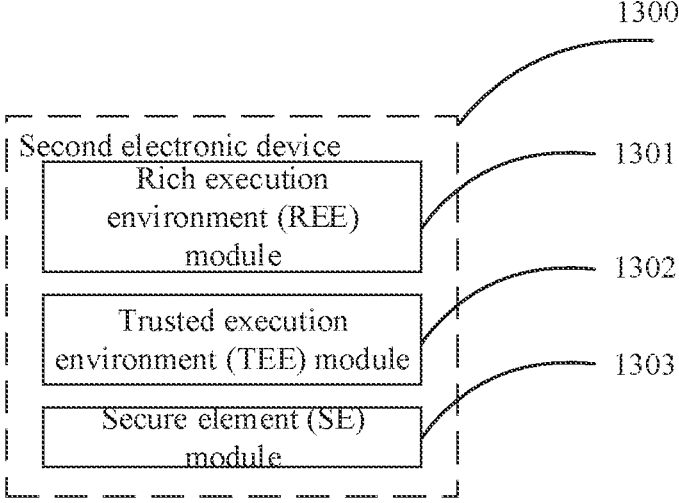
FIG. 13 is a schematic diagram of an apparatus of a second electronic device according to an embodiment of this disclosure.

FIG. 13 is a schematic diagram of an apparatus of a second electronic device according to an embodiment of this disclosure. The apparatus 1300 includes a rich execution environment module 1301, a trusted execution environment module 1302, and a secure element module 1303.

The rich execution environment module 1301 is configured to receive a second transaction request message from a first electronic device, and send the second transaction request message to the trusted execution environment module 1302, where the second transaction request message includes at least one data certificate, the data certificate includes a serial number, and the serial number is a unique identifier of the data certificate.

The trusted execution environment module 1302 is configured to execute second service logic based on the at least one data certificate to obtain a second verification instruction, and send the second verification instruction to the secure element module 1303, where the second verification instruction includes a digital signature.

The secure element module 1303 is configured to verify validity of the at least one data certificate based on the digital signature to obtain a second verification result, and send the second verification result to the trusted execution environment module 1302, where the second verification result indicates whether validity verification of the at least one data certificate succeeds.

The trusted execution environment module 1302 is further configured to receive the second verification result from the secure element module 1303, store the data certificate that succeeds in the verification, and send a second transaction response message to the rich execution environment module 1301, where the second transaction response message is used to indicate whether a transaction succeeds.

The rich execution environment module 1301 is further configured to send the second transaction response message to the first electronic device.

In a possible design, the data certificate includes a currency certificate, the currency certificate includes an original currency string or an original currency string and at least one transaction subchain, the transaction subchain includes a digital signature, the digital signature is used to indicate validity of the transaction subchain, and the original currency string includes an amount of the original currency string, an issuer certificate, and an institution signature.

In a possible design, the second service logic includes verification of an institution signature of the original currency string or verification of a preorder transaction of a last transaction subchain of the currency certificate.

In a possible design, the secure element SE module 1303 is further configured to verify validity of a last transaction subchain of each data certificate of the at least one data certificate.

In a possible design, the secure element module 1303 is further configured to store a digital signature of the last transaction subchain after validity verification of the last transaction subchain succeeds, where the digital signature is used as a reference value for comparison and verification in a subsequent transaction.

Figure 14:
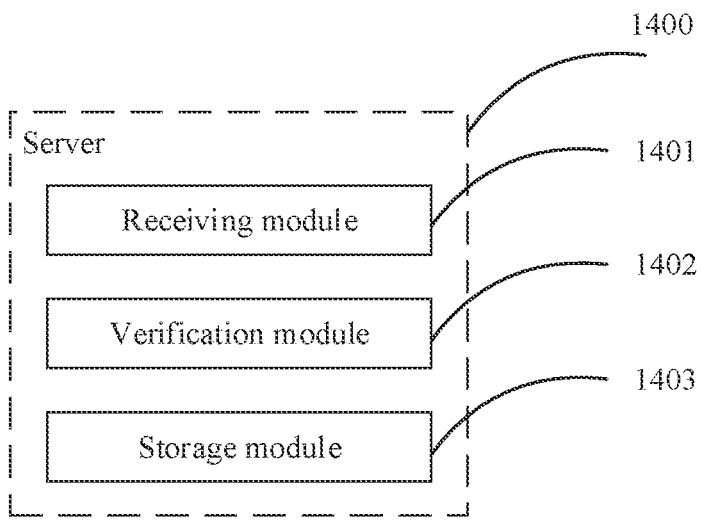
FIG. 14 is a schematic diagram of an apparatus of a server according to an embodiment of this disclosure.

FIG. 14 is a schematic diagram of an apparatus of a server according to an embodiment of this disclosure. The apparatus 1400 includes a receiving module 1401 configured to receive a data certificate from an electronic device, a verification module 1402 configured to perform incremental verification on the data certificate, where the incremental verification includes comparing the data certificate with a historical record stored in the server to verify validity of data that is in the data certificate and that is not in the historical record, where the historical record is a verified historical data certificate, and a storage module 1403 configured to store the data certificate that succeeds in the verification.

In a possible design, the data certificate includes a currency certificate, the currency certificate includes an original currency string or an original currency string and at least one transaction subchain, the original currency string includes an amount of the original currency string, an issuer certificate, and an institution signature, the transaction subchain includes a transaction amount, transaction information, a public key, and a digital signature, and the digital signature is a digital signature generated based on a signature result of a previous transaction and data of a current transaction.

In a possible design, the currency certificate includes a serial number, and the serial number is a unique identifier of the currency certificate. The verification module 1402 is further configured to query, based on the serial number, whether a historical currency certificate corresponding to the serial number exists in the server, traverse transaction subchains of the currency certificate when the historical currency certificate having the same serial number as the currency certificate exists in the server, and verify an unverified transaction subchain that is in the currency certificate and that is not in the historical currency certificate.

In a possible design, the verification module 1402 is further configured to verify all transaction subchains in the currency certificate when no historical currency certificates having a same serial number as the currency certificate exist in the server.

In a possible design, the verification module 1402 is further configured to verify a digital signature, an institution signature, a balance, and a transaction record.

In a possible design, the storage module 1403 is further configured to store, based on the serial number, a verified digital signature of a transaction subchain in the server as feature data.

For a specific implementation of the solution in the apparatus embodiment, refer to the foregoing method embodiment. Details are not described herein again.

When the plurality of functional units (or modules) are integrated into one processing unit, all actions performed by the functional units may be performed by the processing unit based on a program stored in a storage unit. The processing unit may be a processor or a controller. The storage unit may be a memory. When the processing unit is a processor, and the storage unit is a memory, the actions performed by the foregoing functional units may be performed by the processor based on a program stored in the memory.

An embodiment of this disclosure further provides a computer-readable storage medium, including instructions, where when the instructions are run on a computer, the computer is enabled to perform the foregoing methods.

An embodiment of this disclosure further provides a computer program or a computer program product that includes instructions, where when the computer program or the computer program product runs on a computer, the computer is enabled to perform the foregoing methods.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, the procedure or functions according to embodiments of this disclosure are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

Although this disclosure is described with reference to all embodiments herein, in a process of implementing this disclosure that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement several functions enumerated in the claims. Some measures are set forth in dependent claims that are different from each other, but this does not mean that these measures cannot be combined to produce great effect.

Although this disclosure is described with reference to specific features and all embodiments thereof, it is clear that various modifications and combinations may be made to them without departing from the scope of this disclosure. Correspondingly, this specification and the accompanying drawings are merely example description of this disclosure defined by the appended claims, and are considered as any or all of modifications, variations, combinations or equivalents that cover the scope of this disclosure.

What is claimed is:

1. A method, implemented by a first electronic device, for verifying a transaction, wherein the method comprises:

sending, by a rich execution environment (REE) of the first electronic device, a first transaction request message to a trusted execution environment (TEE) of the first electronic device, wherein the first transaction request message comprises a transaction type of a transaction;

executing, by the TEE, a service logic based on the transaction type to obtain a first verification instruction, wherein the first verification instruction comprises a to-be-verified digital signature;

sending, by the TEE, the first verification instruction to a secure element (SE) of the first electronic device;

verifying, by the SE in accordance with receiving the first verification instruction comprising the to-be-verified digital signature, validity of the transaction based on the to-be-verified digital signature to obtain a verification result;

sending, by the SE in accordance with the verifying validity of the transaction, the verification result to the TEE;

sending, by the TEE, a transaction response message to the REE, wherein the transaction response message comprises the verification result;

sending, by the REE, a second transaction request message to a second electronic device based on a receiver identifier of the transaction in accordance with the verification result indicating that the validity of the transaction has been verified, wherein the receiver identifier indicates the second electronic device; and storing, by the TEE, at least one candidate data certificate, wherein the executing the service logic comprises executing, by the TEE, the service logic based on the at least one candidate data certificate, wherein the at least one candidate data certificate comprises a currency certificate, wherein the currency certificate comprises an original currency string and at least one transaction subchain, wherein the original currency string comprises an amount of the original currency string, an issuer certificate, and an institution signature, wherein the at least one transaction subchain comprises a first subchain digital signature corresponding to the at least one transaction subchain, and wherein the currency certificate is used by a cloud server to construct a currency certificate transaction tree structure comprising:

a root node corresponding to the original currency string, and leaf nodes, wherein each leaf node comprises a digital signature of a transaction subchain corresponding to a verified transaction on the original currency string.

2. The method of claim 1, wherein the first transaction request message further comprises a transaction amount of the transaction, and wherein executing the service logic comprises:

selecting, by the TEE, a to-be-verified currency certificate from at least one candidate currency certificate based on the transaction type and the transaction amount;

performing, by the TEE, basic verification on the to-be-verified currency certificate, wherein the basic verification comprises a transaction quantity or a transaction quota verification; and extracting, by the TEE, a second subchain digital signature of a last transaction subchain of the currency certificate that succeeded in the basic verification to generate the first verification instruction, wherein the second subchain digital signature is the to-be-verified digital signature, and wherein the first verification instruction comprises the second subchain digital signature and the transaction amount.

3. The method of claim 2, wherein the currency certificate comprises a serial number that is a unique identifier of the currency certificate, and wherein verifying the validity of the transaction comprises:

generating, by the SE, transaction information based on the transaction amount;

comparing, by the SE, a locally stored reference digital signature with the second subchain digital signature based on the serial number;

generating, by the SE based on the transaction information, the second subchain digital signature, and a private key that is locally stored in the SE, a first digital signature corresponding to the transaction when the locally stored reference digital signature is consistent with the second subchain digital signature;

generating, by the SE based on the first digital signature and the transaction information, a first transaction subchain corresponding to the transaction, wherein a third subchain digital signature in the first transaction subchain is the first digital signature; and generating, by the SE, the verification result comprising the first transaction subchain.

4. The method of claim 3, further comprising:

storing, by the TEE, the verification result; and updating, by the TEE based on the serial number, the first transaction subchain to the currency certificate that succeeded in the basic verification.

5. The method of claim 4, further comprising synchronizing, by the first electronic device to a server, the currency certificate that is updated and that has succeeded in the basic verification.

6. A method, implemented by a second electronic device, for verifying a transaction, wherein the method comprises:

receiving, by a rich execution environment (REE) of the second electronic device, a transaction request message from a first electronic device, wherein the transaction request message comprises at least one data certificate;

sending, by the REE, the transaction request message to a trusted execution environment (TEE) of the second electronic device;

executing, by the TEE, a service logic based on the at least one data certificate to obtain a verification instruction, wherein the verification instruction comprises a to-be-verified digital signature;

sending, by the TEE, the verification instruction to a secure element (SE) of the second electronic device;

verifying, by the SE in accordance with receiving the verification instruction comprising the to-be-verified digital signature, validity of the at least one data certificate based on the to-be-verified digital signature to obtain a verification result that indicates whether validity verification of the at least one data certificate has succeeded;

sending, by the SE in accordance with the verifying validity of the transaction, the verification result to the TEE;

receiving, by the TEE, the verification result from the SE;

storing, by the TEE, at least one candidate data certificate;

sending, by the TEE, a transaction response message to the REE, wherein the transaction response message indicates whether the transaction has succeeded; and sending, by the REE in response to the transaction request message, the transaction response message to the first electronic device, wherein the executing the service logic comprises executing, by the TEE, the service logic based on the at least one candidate data certificate, wherein the at least one candidate data certificate comprises a currency certificate, wherein the currency certificate comprises an original currency string and at least one transaction subchain, wherein the original currency string comprises an amount of the original currency string, an issuer certificate, and an institution signature, and wherein the at least one transaction subchain comprises a first subchain digital signature corresponding to the at least one transaction subchain, and wherein the currency certificate is used by a cloud server to construct a currency certificate transaction tree structure comprising:

a root node corresponding to the original currency string, and leaf nodes, wherein each leaf node comprises a digital signature of a transaction subchain corresponding to a verified transaction on the original currency string.

7. The method of claim 6, wherein the at least one data certificate comprises a currency certificate, wherein the currency certificate comprises an original currency string or comprises the original currency string and at least one transaction subchain, wherein the original currency string comprises an amount of the original currency string, an issuer certificate, and an institution signature, and wherein the at least one transaction subchain comprises a first subchain digital signature corresponding to the at least one transaction subchain.

8. The method of claim 7, wherein the service logic comprises verification of the institution signature.

9. The method of claim 7, wherein verifying the validity of the at least one data certificate comprises verifying validity of a last transaction subchain of the currency certificate.

10. The method of claim 9, further comprising storing, by the SE, a second subchain digital signature of the last transaction subchain after verifying validity of the last transaction subchain has succeeded, wherein the second subchain digital signature is configured to be used as a reference value for comparison and verification in a subsequent transaction.

11. The method of claim 7, wherein the service logic comprises verification of a preorder transaction of a last transaction subchain of the currency certificate.

* * * * *